US009313404B2

(12) United States Patent  (10) Patent No.: US 9,313,404 B2
Hideshima et al.  (45) Date of Patent: Apr. 12, 2016

(54) LENS APPARATUS AND IMAGE CAPTURING APPARATUS

(71) Applicant: FUJIFILM Corporation, Tokyo (JP)

(72) Inventors: Masahiro Hideshima, Saitama (JP); Atsushi Misawa, Saitama (JP); Akihiro Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 103 days.

(21) Appl. No.: 14/229,035

(22) Filed: Mar. 28, 2014

(65) Prior Publication Data

US 2014/0211030 A1   Jul. 31, 2014

Related U.S. Application Data

(63) Continuation of application No. PCT/JP2012/073659, filed on Sep. 14, 2012.

(30) Foreign Application Priority Data

Sep. 29, 2011  (JP) .................................. 2011-215644
Sep. 29, 2011  (JP) .................................. 2011-215645

(51) Int. Cl.
*H04N 5/228* (2006.01)
*H04N 5/232* (2006.01)
(Continued)

(52) U.S. Cl.
CPC .......... *H04N 5/23287* (2013.01); *G02B 27/646* (2013.01); *G03B 5/00* (2013.01);
(Continued)

(58) Field of Classification Search
CPC .......... H04N 5/23296; H04N 5/23264; H04N 5/2328; H04N 5/23287; G03B 2205/0015; G03B 2205/0046; G02B 27/646

USPC ......... 348/208.99, 208.4, 208.7, 208.12, 347, 348/357

See application file for complete search history.

(56) References Cited

U.S. PATENT DOCUMENTS 6,169,853 B1    1/2001  Hasushita et al.
7,528,882 B2 *  5/2009  Saori ........................ G02B 3/10
                                                     348/335

(Continued)

FOREIGN PATENT DOCUMENTS

DE         19900146 A1   7/1999
JP      2004-247947 A1   9/2004

(Continued)

OTHER PUBLICATIONS

Extended European Search Report for European Application No. 12835062.6, dated Jun. 3, 2015.

(Continued)

*Primary Examiner* — Kelly L Jerabek
(74) *Attorney, Agent, or Firm* — Birch, Stewart, Kolasch & Birch, LLP

(57) ABSTRACT

A lens apparatus includes: an optical system which includes a movable lens group, the optical system including a first correction lens group which adjusts an optical performance of the optical system and a second correction lens group which adjusts a center position of an image which is formed by the optical system; and a control unit which controls driving of the first correction lens group so as to correct the change of the optical performance due to movement of the movable lens group based on position information of the movable lens group and controls driving of the second correction lens group so as to correct displacement of the center of an image due to the movement of the movable lens group and the first correction lens group based on position information of the first correction lens group.

16 Claims, 36 Drawing Sheets

(51) Int. Cl.
*G03B 5/00* (2006.01)
*G02B 27/64* (2006.01)
*H04N 5/225* (2006.01)
*G02B 7/10* (2006.01)

(52) U.S. Cl.
CPC ........ *H04N 5/2258* (2013.01); *H04N 5/23212* (2013.01); *H04N 5/23219* (2013.01); *G02B 7/102* (2013.01); *G03B 2205/0015* (2013.01); *G03B 2205/0023* (2013.01); *G03B 2205/0046* (2013.01)

(56) References Cited

U.S. PATENT DOCUMENTS

| | | | |
|---|---|---|---|
| 2004/0184163 A1 | 9/2004 | Nishioka et al. | |
| 2005/0024504 A1 | 2/2005 | Hoshi | |
| 2005/0062852 A1* | 3/2005 | Yamazaki | H04N 5/23248 348/208.6 |
| 2005/0276172 A1* | 12/2005 | Tsutsumi | G02B 27/646 369/44.14 |
| 2005/0276588 A1* | 12/2005 | Tsutsumi | G02B 27/646 396/55 |
| 2006/0056046 A1* | 3/2006 | Saori | G02B 13/009 359/680 |
| 2007/0008415 A1* | 1/2007 | Higo | G03B 5/00 348/208.11 |
| 2010/0149351 A1* | 6/2010 | Tanaka | H04N 5/23248 348/208.5 |
| 2011/0032615 A1 | 2/2011 | Usui et al. | |
| 2011/0115929 A1* | 5/2011 | Noguchi | G03B 5/00 348/208.4 |
| 2011/0164863 A1 | 7/2011 | Hayashi | |

FOREIGN PATENT DOCUMENTS

| | | |
|---|---|---|
| JP | 2005-49598 A | 2/2005 |
| JP | 2009-175240 A | 8/2009 |
| JP | 2010-237250 A | 10/2010 |
| JP | 2011-186162 A | 9/2011 |
| WO | WO 2009/093635 A1 | 7/2009 |

OTHER PUBLICATIONS

Written Opinion of the International Searching Authority dated Dec. 25, 2012, issued in PCT/JP2012/073659) (Form PCT/ISA/237).

International Search Report, mailed Dec. 25, 2012, issued in PCT/JP2012/073659.

Written Opinion of the International Searching Authority, mailed Dec. 25, 2012, issued in PCT/JP2012/073659.

* cited by examiner

FIG. 13A

| FOCUS LENS GROUP | ZOOM LENS GROUP | IRIS | ECCENTRICITY CORRECTION LENS GROUP | RESOLUTION |
|---|---|---|---|---|
| a01 | b01 | c01 | d01 | x01 |
| a02 | b02 | c02 | d02 | x02 |
| a03 | b03 | c03 | d03 | x03 |
| ⋮ | ⋮ | ⋮ | ⋮ | ⋮ |

FIG. 13B

| FOCUS LENS GROUP | ZOOM LENS GROUP | IRIS | TILT CORRECTION LENS GROUP | RESOLUTION |
|---|---|---|---|---|
| a01 | b01 | c01 | e01 | y01 |
| a02 | b02 | c02 | e02 | y02 |
| a03 | b03 | c03 | e03 | y03 |
| ⋮ | ⋮ | ⋮ | ⋮ | ⋮ |

LENS APPARATUS AND IMAGE CAPTURING APPARATUS

CROSS REFERENCE TO RELATED APPLICATIONS

This is a continuation of International Application No. PCT/JP2012/073659 filed on Sep. 14, 2012, and claims priority from Japanese Patent Application Nos. 2011-215644, filed on Sep. 29, 2011, and 2011-215645, filed on Sep. 29, 2011, the entire disclosures of which are incorporated herein by reference.

TECHNICAL FIELD

The present invention relates to a lens apparatus and an image capturing apparatus.

BACKGROUND ART

Currently, a high definition video system such as a super high vision is studied. When an image is captured using a high definition video system, a 4 k (the number of pixels of 4096 in width by 2160 in length) or 8 k (the number of pixels of 8192 in width by 4320 in length) high definition camera is used.

The high definition camera is required to have a small assembly error of each lens group in order to correspond to a high image quality. Generally, a lens group is adjusted such that errors of the lens groups are adjusted after being assembled to prevent degradation of an image due to variation in the lens groups and between the lens groups. However, in the camera after being assembled, if a condition of an optical system such as a position of a movable lens group is changed when an image is captured, an eccentricity which is one of an assembly error in each lens group may be generated. This is because an influence of an aberration on the eccentricity of each lens group varies depending on the condition of the optical system.

Therefore, Patent Literatures 1 and 2 disclose an image capturing apparatus which eccentrically drives an eccentric lens group with respect to an optical axis of the movable lens group based on the condition of the movable lens group at the time of capturing an image to adjust an image quality.

CITATION LIST

Patent Literature

Patent Literature 1: JP-A-2010-237250
Patent Literature 2: JP-A-2009-175240

SUMMARY OF INVENTION

Technical Problem

As a movable lens group and an eccentric lens group move, a center of an image which is formed by an optical system may be displaced. In the image capturing apparatus disclosed in Patent Literature 1, a cutout position of image data obtained from an image capturing element is changed to cope with the displacement at the center of the image. However, generally, pixels at the periphery of the image capturing elements tend to have more noises than pixels at the center thereof. Therefore, due to the displacement of the center of the image, if a periphery of the image is formed at a periphery of the image capturing element, an image quality may be lowered.

Further, in order to move the lens group, an electromagnetic actuator such as a voice coil motor is typically used. In a lens apparatus which is configured to correct an optical performance of the optical system by moving a correction lens group like the lens apparatus disclosed in Patent Literature 1, in order to retain the moved correction lens group in position, current needs to be continuously supplied to the electromagnetic actuator which moves the correction lens group. Therefore, it is expected that power consumption in the lens apparatus is increased.

Further, in the lens apparatus disclosed in Patent Literature 2, an electromagnetic lock is provided to retain the correction lens group in position. However, in order to maintain the correction lens group in that position using the electromagnetic lock, current also needs to be continuously supplied to the electromagnetic lock so that the increase of the power consumption in the lens apparatus may not be suppressed.

The present invention has been made in an effort to provide a lens apparatus and an image capturing apparatus which may capture a high quality image regardless of displacement of a center of an image due to movement of a movable lens group and an eccentric lens group. Further, the present invention has been made in an effort to provide a lens apparatus and an image capturing apparatus which may suppress increase of power consumption when a change of an optical characteristic of an optical system is corrected by moving the correction lens group.

Solution to Problem (1) It is a lens apparatus including: an optical system which includes a movable lens group, the optical system including a first correction lens group which adjusts an optical performance of the optical system by changing a position with respect to an optical axis and a second correction lens group which adjusts a center position of an image which is formed by the optical system by changing the position with respect to the optical axis in a plane perpendicular to the optical axis; and a control unit which controls driving of the first correction lens group so as to correct the change of the optical performance due to movement of the movable lens group based on position information of the movable lens group and controls driving of the second correction lens group so as to correct displacement of the center of an image due to the movement of the movable lens group and the first correction lens group based on position information of the first correction lens group.

(2) It is the lens apparatus of (1), further including: a retaining unit which is mechanically engaged with a lens frame which supports the first correction lens group to retain the moved first correction lens group in position.

(3) It is an image capturing apparatus including: a lens apparatus which includes an optical system including a movable lens group; and a main body of an image capturing apparatus in which the lens apparatus is mounted, in which the optical system includes a first correction lens group which adjusts an optical performance of the optical system by changing a position with respect to an optical axis; and a second correction lens group which adjusts a center position of an image which is formed by the optical system by changing the position with respect to the optical axis in a plane perpendicular to the optical axis, and the main body of the image capturing apparatus includes a control unit which controls driving of the first correction lens groups so as to correct the change of the optical performance due to movement of the movable lens group based on position information of the movable lens group and controls driving of the second correction lens group so as to correct displacement of the center of an image due to the movement of the movable lens group and the first correction lens group based on position information of the first correction lens group.

(4) It is the image capturing apparatus of (3), further including: a retaining unit which is mechanically engaged with a lens frame which supports the first correction lens group to retain the moved first correction lens group in position.

Advantageous Effects of Invention

According to the present invention, displacement of a center of an image due to the movement of a movable lens group and a first correction lens group is corrected using a second correction lens group to remove or suppress displacement of the center of the image. Accordingly, a high quality image may be captured regardless of the displacement of the center of the image due to the movement of the movable lens group and the first correction lens group. Further, according to the present invention, the correction lens group is moved to adjust the optical performance of the optical system so that a high quality image can be captured regardless of the secular change or change of the photographing condition. Further, a retaining unit which retains the correction lens group in position is mechanically engaged with a lens frame which supports the correction lens group to retain the correction lens group in position so that no power is consumed to retain the correction lens group in that position, which may suppress the power consumption in the lens apparatus.

BRIEF DESCRIPTION OF DRAWINGS

FIGS. 13A and 13B are diagrams illustrating data structures of data tables stored in a storing unit of a lens apparatus.

DESCRIPTION OF EMBODIMENTS

Figure 1:
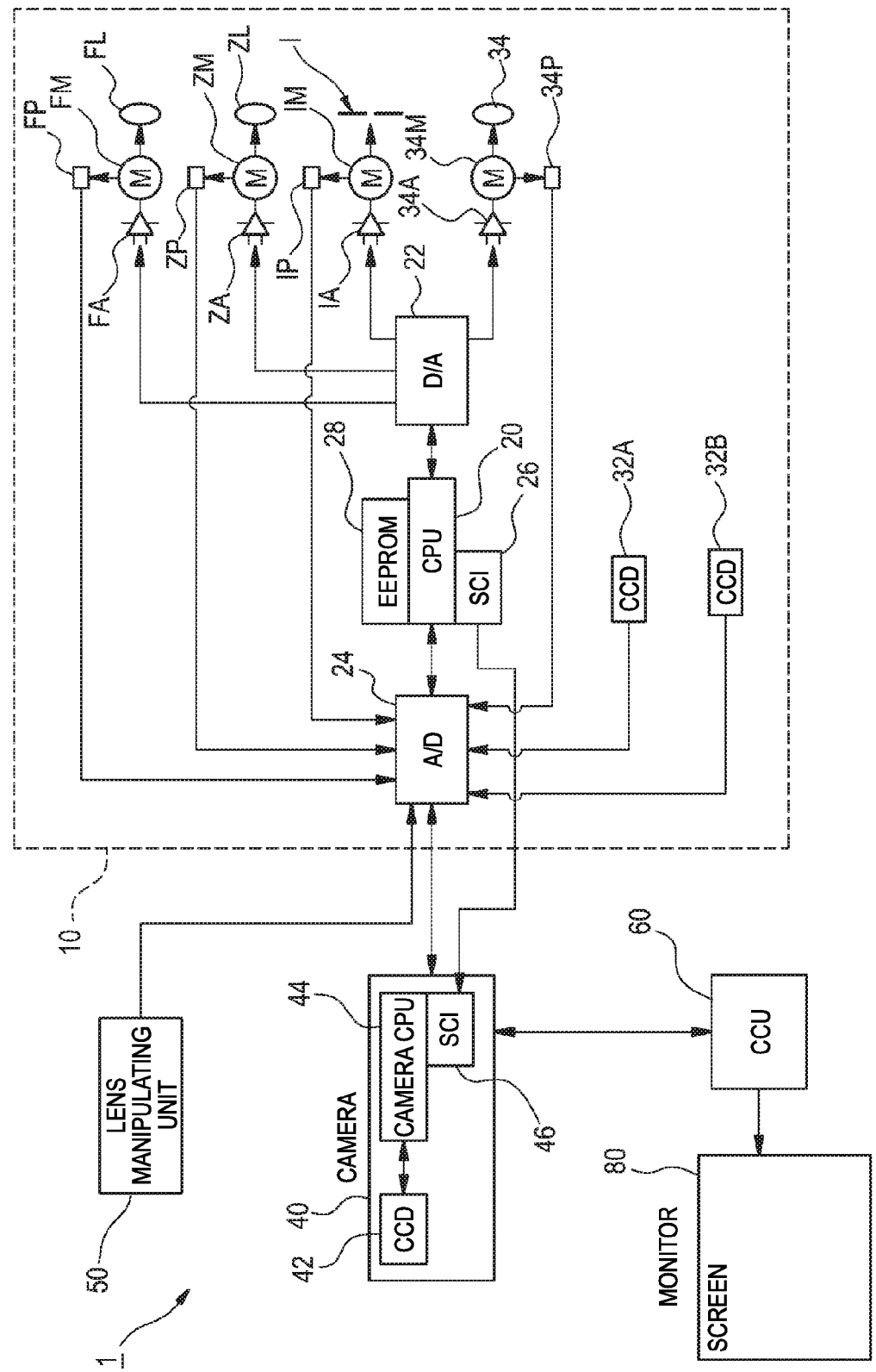
FIG. 1 is a block diagram illustrating a main configuration of a camera system which includes a lens apparatus.
Figure 2:
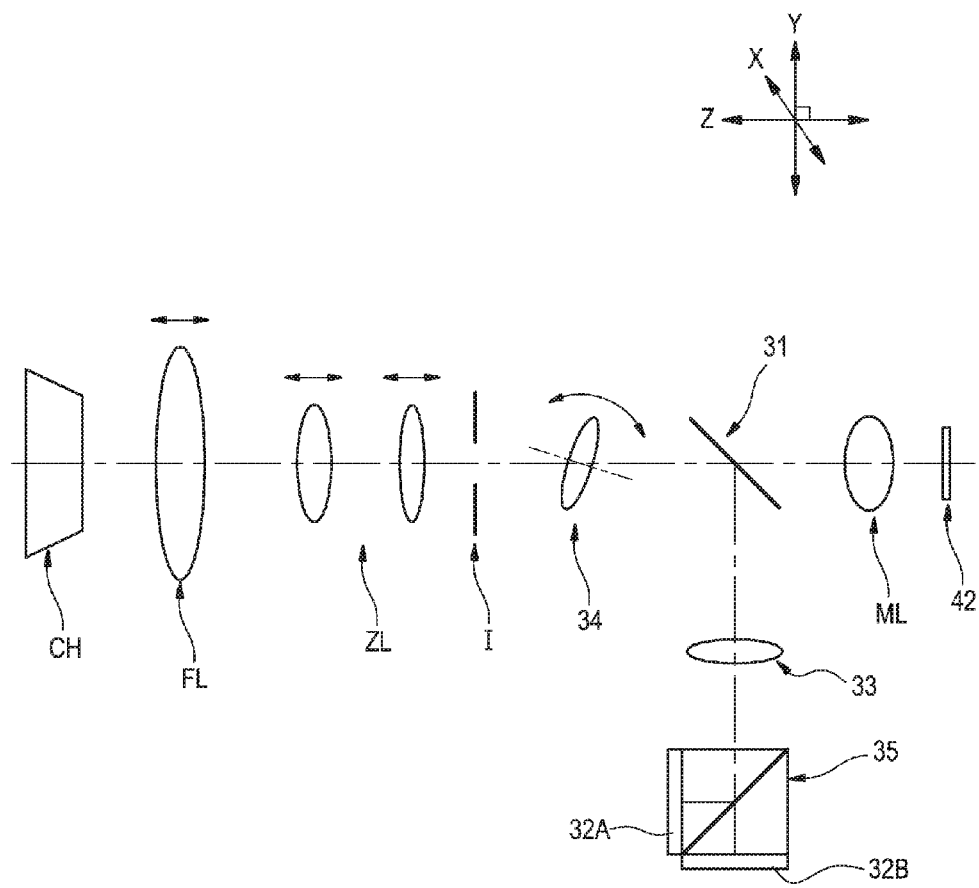
FIG. 2 is a diagram schematically illustrating an optical system of the camera system of FIG. 1.

FIG. 1 is a block diagram illustrating a main configuration of a camera system which includes a lens apparatus of an embodiment of the present invention. FIG. 2 is a diagram schematically illustrating an optical system of the lens apparatus.

As illustrated in FIG. 1, a camera system 1 includes a lens apparatus 10 and a camera main body 40.

The lens apparatus 10 is a lens apparatus such as an EFP lens or an ENG lens which is used for broadcasting. The lens apparatus 10 includes a photographic lens (an optical system)

which is mounted in the camera main body 40 and a control system which controls the optical system.

The optical system of the lens apparatus 10 is a photographic optical system which connects an image of a subject to an image capturing surface of an image capturing element 42 of the camera main body 40. In the optical system, a focus lens group FL, a zoom lens group ZL, an iris I, a tilt correction lens group 34, a beam splitter 31, and a master lens group ML are provided in this order from the subject toward the image capturing surface.

The beam splitter 31 is a half mirror which splits a light flux which transmits an eccentricity correction lens group into a first optical path in which the light flux is directed to the image capturing surface and a second optical path in which the light flux is reflected in a direction substantially perpendicular to the first optical path.

In the second optical path, a collecting lens 33 which collects light reflected by the beam splitter 31 and a beam splitter 35 which further splits the light collected by the collecting lens 33 are provided.

The beam splitter 35 is a cube type half mirror which splits the light flux which is incident along the second optical path into two light fluxes. Two light emitting surfaces are formed in the beam splitter and CCDs 32A and 32B are formed in the two light emitting surfaces, respectively. Further, the CCDs 32A and 32B are disposed in a position where an image of light fluxes which pass through the second optical path is formed so as to be conjugated to each other.

The CCDs 32A and 32B are used to detect a focused status. Further, the CCDs 32A and 32B are also used to correct the eccentricity, which will be described below.

The focus lens group FL moves in the optical axis direction to change a distance to the subject. The zoom lens group ZL moves in the optical axis direction to change a focal distance. The iris I is driven to be open or closed so that an opening of the iris is changed to vary an iris value. Here, lens groups which move a position of each lens group based on a photographing condition, such as the focus lens group FL and the zoom lens group ZL, are collectively called a movable lens group.

The tilt correction lens group 34 rotates around a direction which is perpendicular to the optical axis direction as an axis to change a tilt angle. As it will be described below, the tilt correction lens group 34 is a correction lens group which is driven and controlled to change the tilt angle with respect to the optical axis of the optical system to adjust a position of a central line of the light flux which transmits the optical system, so that degradation of an image quality which depends on the eccentricities of individual lenses is suppressed.

The control system of the lens apparatus 10 includes a CPU 20, an EEPROM 28, amplifiers FA, ZA, IA, and 34A, motors FM, ZM, IM, and 34M, and potentiometers FP, ZP, IP, and 34P.

Further, a lens manipulating unit 50, the camera main body 40, a camera controller unit CCU 60, and a monitor which are connected to the lens apparatus 10 as external equipment also configure a control system in the whole lens system.

The camera main body 40 includes an image capturing element 42 in which an image is formed by the optical system of the lens apparatus 10. The image capturing element 42 is a CCD.

The CPU 20 of the lens apparatus 10 is a control unit which generally controls lenses such as the focus lens group FL or the zoom lens group ZL.

The EEPROM 28 is a storing unit in which various data concerning an operation of the lens apparatus 10 is stored.

The CPU 20 outputs a driving signal to the amplifiers FA, ZA, and IA through a D/A converter 22. Accordingly, the motors FM, ZM, and IM which are connected to the amplifiers FA, ZA, and IA are driven at a rotational speed in accordance with a value (a voltage) of the driving signal.

The motors FM, ZM, and IM are connected to the focus lens group FL, the zoom lens group ZL, and the iris I of the photographic lens. The motors FM, ZM, and IM are driving units which drive the focus lens group FL, the zoom lens group ZL, and the iris I by driving the motors.

The potentiometers FP, ZP, and IP are connected to the focus lens group FL, the zoom lens group ZL, and the iris I, respectively, as positional sensors which detect the positions thoseof. In the meantime, the potentiometers FP, ZP, and IP may be provided in output axes of the motors FM, ZM, and IM so as to interwork with the focus lens group FL, the zoom lens group ZL, and the iris I.

The potentiometers FP and ZP are provided as lens position acquiring units and a voltage signal with a value (a value indicating an absolute position) corresponding to the position of the focus lens group FL is output from the potentiometer FP and a voltage signal with a value (a value indicating an absolute position) corresponding to the position of the zoom lens group ZL is output from the potentiometer ZP to be given to the CPU 20 through an A/D converter 24. The potentiometer IP outputs a voltage signal with a value (a value indicating an absolute position) corresponding to the iris position of the iris I so that the output voltage signal is given to the CPU 20 through the A/D converter 24.

The CPU 20 changes the values of the driving signals which are output to the amplifiers FA and ZA while referring to the lens positions of the focus lens group FL and the zoom lens group ZL which are detected by the potentiometers FP and ZP to control the positions or operating speeds of the focus lens group FL and the zoom lens group ZL to be a desired state.

The lens manipulating unit 50 is a controller which includes a manual manipulating member which designates a position or a moving speed a target to be focused (the focus lens group FL) or zoomed (the zoom lens group ZL) of the photographic lens by manual manipulation. The lens manipulating unit 50 includes a focus demand and a zoom demand which are not illustrated and is connected to the CPU 20 through the A/D converter 24. The manual manipulating members are provided in the focus demand and the zoom demand, respectively.

When the manual manipulating member of the focus demand of the lens manipulating unit 50 is manipulated, a focus command signal which designates a target position of the focus corresponding to the position of the manipulating member is given to the CPU 20. The CPU 20 controls the motor FM by a driving signal which is output to the amplifier FA to control the position of the focus lens group FL so that the position of the focus lens group FL which is detected by the potentiometer FP becomes a target position designated by the focus command signal. In the meantime, generally, the position of the focus lens group FL is controlled in accordance with the target position given from the focus demand in the manual focus so that a moving speed of a target is given from the focus demand and thus a speed of the focus lens FL may be limited.

When a manual manipulating member of the zoom demand of the lens manipulating unit 50 is manipulated, a zoom command signal which designates a moving speed of a target to be zoomed corresponding to the position of the manipulating member is given to the CPU 20. The CPU 20 controls the motor ZM by the driving signal which is output to the amplifier ZA to control the moving speed of the zoom lens group ZL so that a moving speed of the zoom lens group ZL becomes the target moving speed designated by the zoom command signal. In the meantime, in the speed limitation, information of the position of the zoom lens group ZL which is obtained from the potentiometer ZP is used to reduce a speed around an edge. Further, in the zoom control, a speed of the zoom lens group ZL is controlled in accordance with the target moving speed given from the zoom demand. In this case, the target position is given from the zoom demand so that the position of the zoom lens group ZL may be controlled.

Further, the CPU 20 controls communication with the external equipment. The CPU 20 may perform serial communication with a camera CPU 44 of the camera main body 40 through serial communication interfaces (SCI) 26 and 46 or perform parallel communication with the camera main body 40. The CPU 20 of the lens apparatus 10 transmits lens information such as a zoom position or a focus position detected by the potentiometers FP and ZP to the camera CPU 44 of the camera main body 40. The camera CPU 44 gives an iris command signal which designates the target position of the iris to the CPU 20. The CPU 20 controls the motor IM by a driving signal which is output to the amplifier IA to control an iris position of the iris I so that the iris position (an opening degree) of the iris I which is detected by the potentiometer IP becomes the target position which is designated by the iris command signal given by the camera CPU 44.

A CCU 60 is connected to the camera main body 40. The CCU 60 has a function of adjusting an image quality by various functions in accordance with the image signal by inputting an image signal obtained by the CCD 42 of the camera main body 40.

The image signal is given through the CCU 60 from the camera main body 40 and an image created based on the image signal is displayed on a screen of a monitor 80.

When the CPU 20 controls the tilt correction lens group, the CPU 20 outputs a driving signal to the amplifier 34A through a D/A converter 22. Therefore, the motor 34M which is connected to the amplifier 34A is driven at a rotational speed in accordance with a value (voltage) of the driving signal.

The motor 34A is connected to the eccentricity correction lens group 12. The motor 34M is connected to the tilt correction lens group 34 to be driven to cause the tilt correction lens group 34 to be tilted with respect to a plane (X-Y plane) perpendicular to the optical axis such that a tilt angle of the tilt correction lens group 34 is changed.

The potentiometer 34P is provided as a position acquiring unit of the correction lens group. A voltage signal with a value corresponding to the tilt angle of the tilt correction lens group 34 is output from the potentiometer 34P. The voltage signal output from the potentiometer 34P is given to the CPU 20 through the A/D converter 24.

The CPU 20 changes a value of the driving signal output to the amplifier 34A by referring to the tilt angle of the tilt correction lens group 34 detected by the potentiometer 34P, the lens position of the movable lens group, and a data table to control the tilt angle of the tilt correction lens group 34.

The lens apparatus 10 has a function of detecting a contrast type focusing position using a CCD 32A and a CCD 32B. Next, this type of focusing position detection will be described.

In the lens apparatus 10, in an image formation position of the second optical path of the optical system, the CCD 32A and the CCD 32B are displaced so as to be displaced at the same interval before and after the image formation position in the central line direction of the light flux. By doing this, the focused status is simultaneously detected by the CCDs 32A and 32B so that a speed of specifying the focusing position is improved as compared with wobbling.

Figure 3:
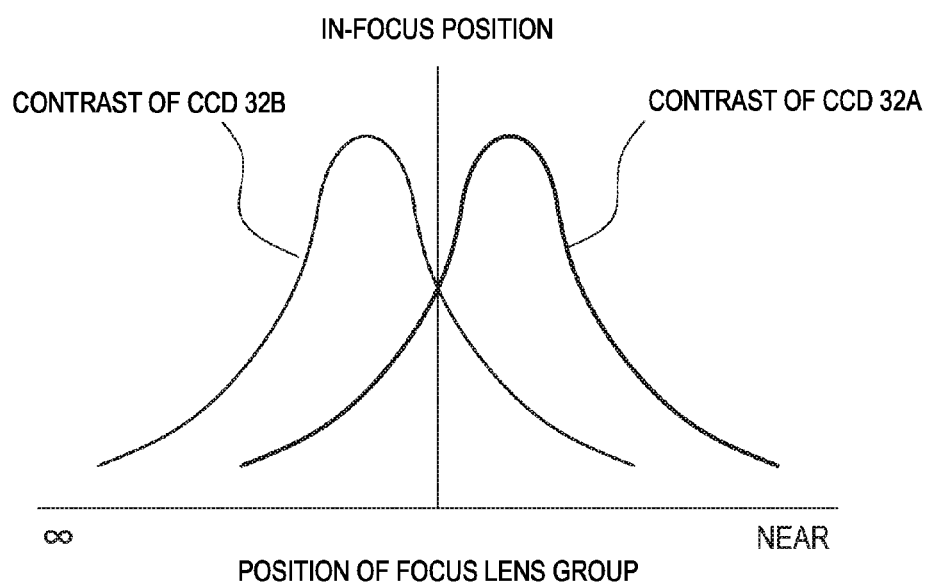
FIG. 3 is a diagram illustrating a method of adjusting a focus by the camera system of FIG. 1.

The drawing illustrates a method of adjusting a focus by the lens apparatus 10. FIG. 3 illustrates a relationship between the position of the focus lens group FL and the contrasts detected by the CCDs 32A and 32B.

As illustrated in FIG. 3, when the focusing position of the lens apparatus 10 is detected, the focus lens group FL is controlled to be in a position where an evaluation value of the CCD 32A is equal to an evaluation value of the CCD 32B so that a focus evaluation value (hereinafter, referred to as an evaluation value) which indicates a contrast on an image formation surface of the CCD 42 at the side of the camera main body 40 is maximum.

By comparing the evaluation values of the two CCDs 32A and 32B, it is possible to determine a better choice to move the focus lens group FL to a FAR edge or a NEAR edge so that a focus speed may be set in accordance with a difference (or ratio) of the evaluation values. Therefore, differently from a general climbing type AF, an AF method of the lens apparatus 10 does not require an operation of overshooting a focusing point.

The lens apparatus 10 uses the above-described CCDs 32A and 32B to correct the eccentricity of the optical system of the lens apparatus 10 without using the CCD 42 of the camera main body 40.

The lens apparatus 10 corrects eccentricity as a single body during assembling in a manufacturing factory or maintenance.

Here, the optical system in the first optical path is equivalent to the optical system in the second optical path. That is, in the second optical path, the eccentricity is corrected using the CCD 32A and the CCD 32B so that the adjustment is performed like the eccentricity correction using the CCD 42 of the camera main body 40 on which an image of the light flux of the first optical path is formed.

Figure 4:
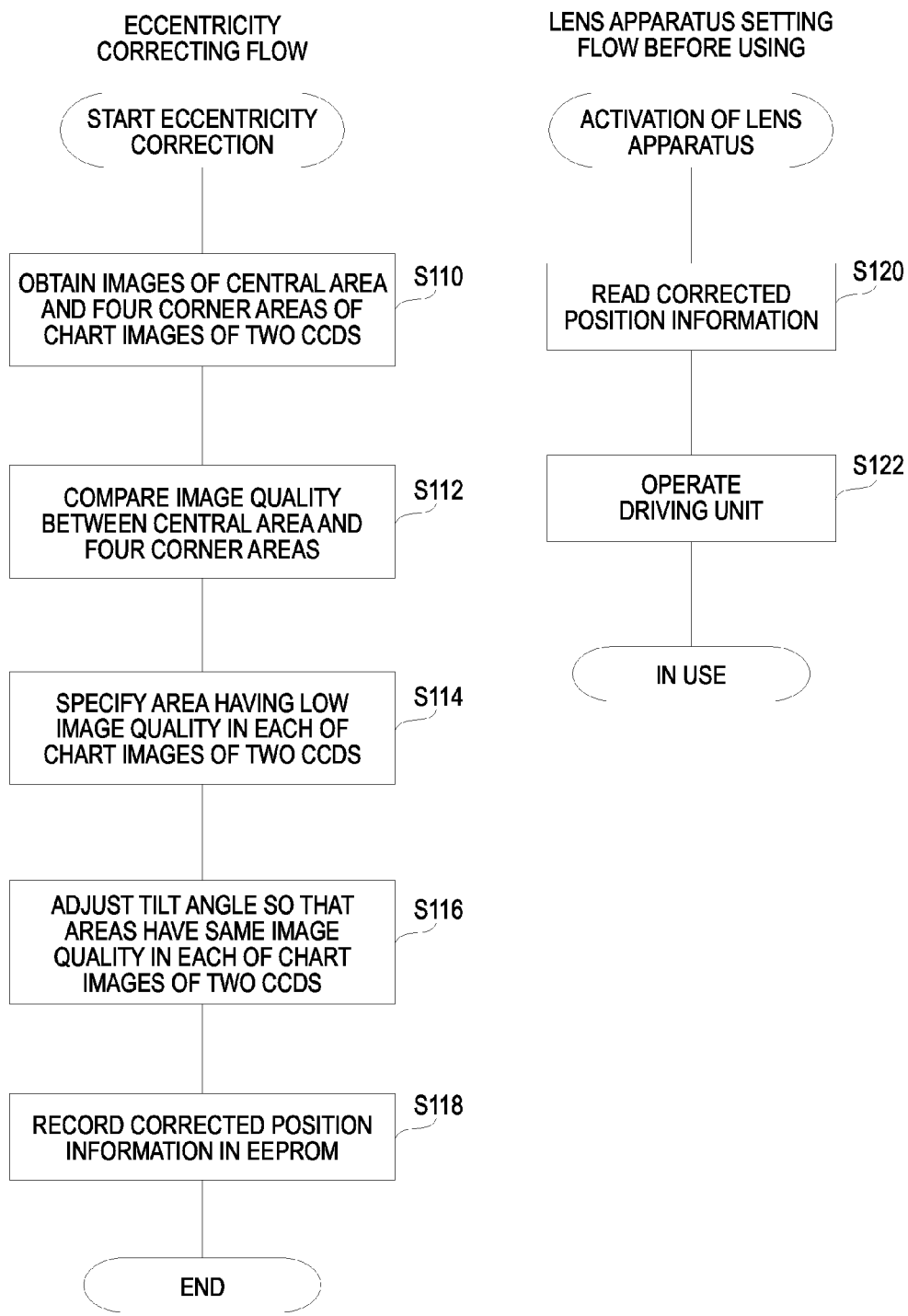
FIG. 4 is a flowchart illustrating a procedure of adjusting an eccentricity in the lens apparatus of FIG. 1.

FIG. 4 is a flowchart illustrating a procedure of correcting an eccentricity in the lens apparatus of FIG. 1.

First, when the eccentricity is corrected by the control of the CPU 20, as illustrated in FIG. 2, the lens apparatus 10 captures an image quality evaluation chart CH using the CCDs 32A and 32B to obtain a chart image. In this case, a total of five images from a central area and four corner areas are obtained among the chart images obtained by the CCD 32A (step S110). The CPU 20 calculates values of contrasts of the image of the central area and images of the four corner areas. In this embodiment, it is assumed that the value of the contrast is used as an evaluation value.

Figure 5:
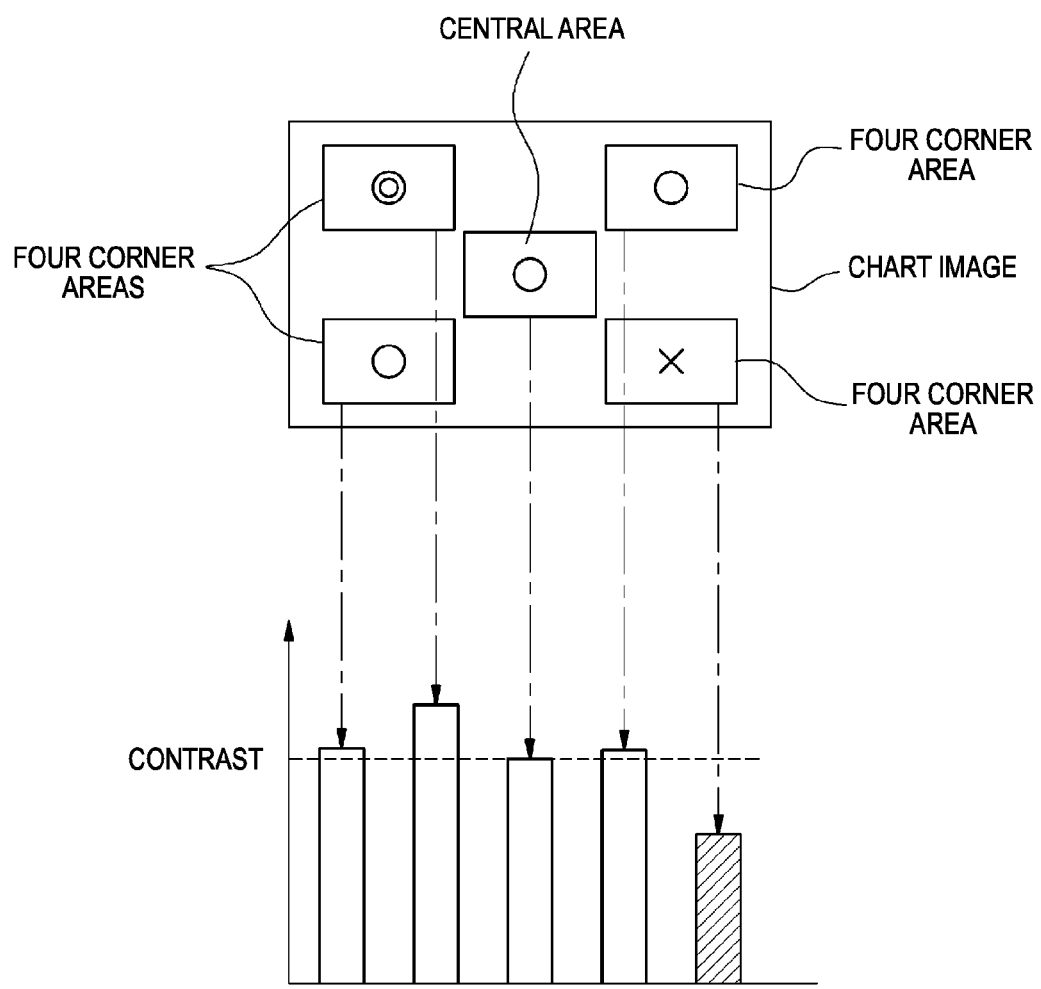
FIG. 5 is a diagram illustrating an image obtained by a CCD of the lens apparatus and contrasts in every area of the image.

Thereafter, the CPU 20 compares the contrast value of the image of the central area and the contrast values of the images of the four corner areas based on the calculated evaluation value in each area (step S112). FIG. 5 is a diagram schematically illustrating contrasts of areas of the chart image. In FIG. 5, the chart images obtained by one CCD are schematically illustrated. In this example, chart images are obtained from the CCD 32A and the CCD 32B, respectively, to compare the image of the central area with the images in other areas in two chart images, respectively.

In FIG. 5, the contrast of an image in an upper left area is the highest and the contrasts of the images in the central area, an upper right area, and a lower left area are the next highest, and a contrast of an image in the lower right area is the lowest. In FIG. 5, the contrast of the image in the upper left area is higher than the contrast of the image in the central area and the difference between the contrasts is larger than that of the other areas so that an image quality in the upper left area is determined to be good and represented by "⊚". In contrast, the contrast of the image in the lower right area is lower than the contrast of the image of the central area so that the image quality in the lower right area is determined to be bad and represented by "x".

Here, the comparison of the images in the respective areas may be performed based on a predetermined threshold value. If the value of the contrast is larger than the threshold value, the contrast is represented by "○" and if the value of the contrast is smaller than the threshold value, the contrast is represented by "x". Further, the value of the contrast is larger than the threshold value and the difference therebetween is equal to or higher than a predetermined value, the contrast may be represented by "⊚".

In the meantime, a method of comparing the images in the areas is not limited to the method that uses the threshold value as described above. For example, an average value of the contrasts is calculated from the contrast values of the areas to evaluate qualities of the images of the areas based on the average value.

The CPU 20 compares the qualities of the images of the areas as described above to specify an area where the qualities of the images of the CCD 32A and the CCD 32B are the lowest (step S114). Next, the CPU 20 drives the tilt correction lens group 34 to change the tilt angle so as to increase the evaluation value of the image of the area having a low image quality so that the images of the areas are adjusted to have the substantially same image quality (step S116).

Figure 6:
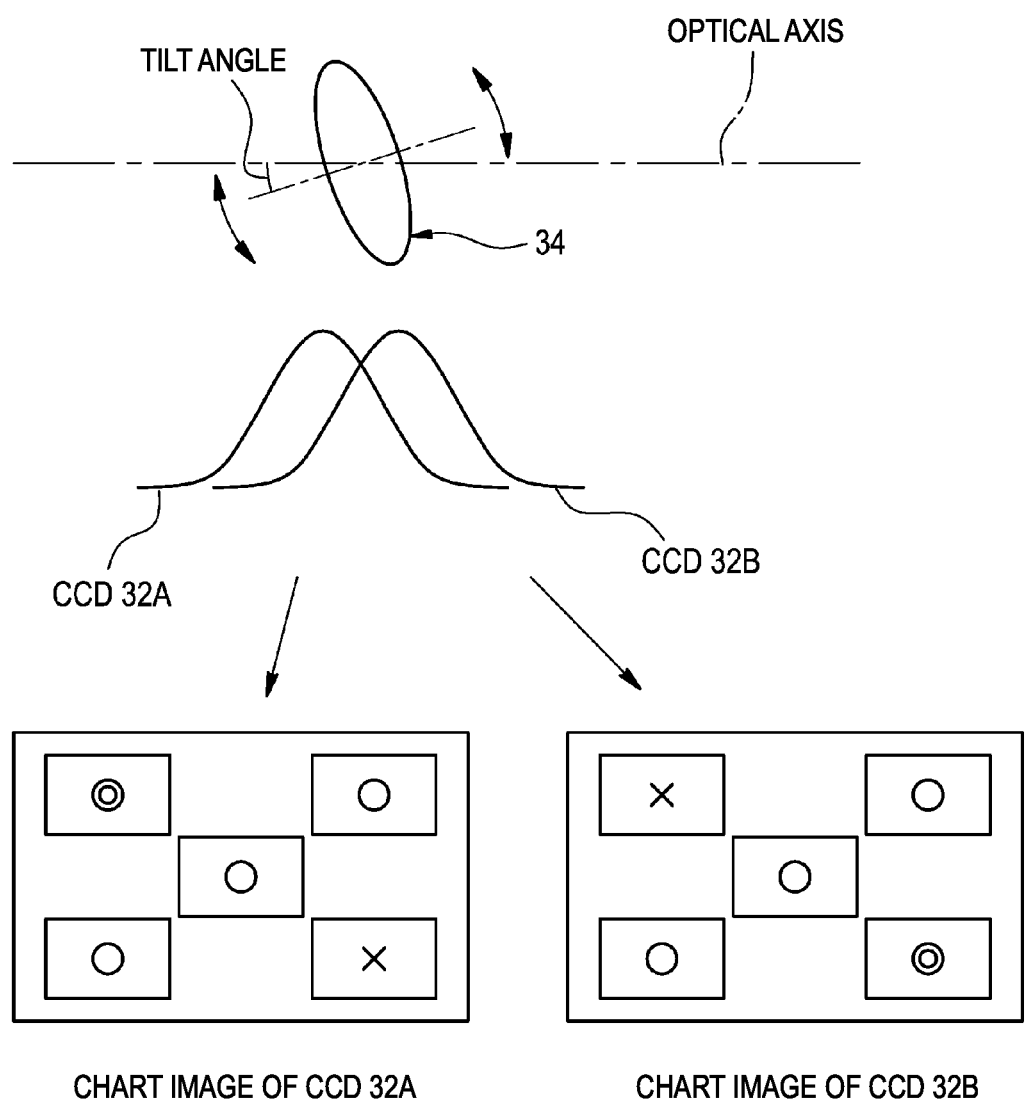
FIG. 6 is a diagram illustrating a method of setting a tilt angle of a tilt correction lens group based on a chart image in the lens apparatus of FIG. 1.

FIG. 6 is a diagram illustrating a method of setting a tilt angle of the tilt correction lens group 34 based on the chart image.

The CCD 32A and the CCD 32B are disposed so as to be conjugated to each other in the image formation position of the second optical path so that the chart images obtained from the CCD 32A and the CCD 32B have symmetrical evaluation values of the areas. As illustrated in FIG. 6, the evaluation value of the image in the upper left area of the CCD 32A is the highest but the evaluation value of the image in the lower right area is the highest in the CCD 32B. Further, the evaluation value of the image in the lower right area of the CCD 32A is the lowest, but the evaluation value of the image in the upper left area becomes the lowest in the CCD 32B. As described above, in the chart images obtained from the CCD 32A and the CCD 32B, the relationships between the evaluation values of the areas are conjugated to each other. In the lens apparatus 10, the tilt angle of the tilt correction lens group 34 is set by the driving control of the CPU 20 based on the symmetric property of the chart images obtained from the CCD 32A and the CCD 32B.

Here, a direction of changing the tilt angle of the tilt correction lens group 34 is determined depending on a design of the optical system of the lens apparatus 10. In FIG. 6, the tilt correction lens group 34 is schematically illustrated as a single lens, but actually, other lens groups are disposed on a side of the tilt correction lens group 34 facing the subject and a side of an image plane of the tilt correction lens group 34 and a direction where an image is shifted by tilting the tilt correction lens group 34 is changed depending on a lens shape or the number of the other lens groups. Therefore, in order to determine a direction in which the image is shifted depending on a direction in which the tilt angle of the tilt correction lens group 34 is moved in consideration of the design of the optical system of the lens apparatus 10, the CPU 20 may drive and control the tilt correction lens group 34 in a predetermined direction in accordance with the design of the optical system when the eccentricity is corrected.

When the tilt angle of the tilt correction lens group 34 is changed so that the values of the contrasts of the images of the areas are equal to or higher than the threshold value, the CPU 20 determines that the qualities of the images of the areas are uniformized. Alternatively, when the difference between a maximum value and a minimum value of the contrast of the images of the areas is within a predetermined range, the CPU 20 may determine that the qualities of the images of the areas are uniformized. Alternatively, when the values of the contrasts of the images of the areas are equal to or higher than the threshold value and the difference between a maximum value and a minimum value of the contrasts of the images of the areas is within a predetermined range, the CPU 20 may determine that the qualities of the images of the areas are uniformized.

In the flowchart of FIG. 4, after adjusting the qualities of the images of the areas to be uniformized, the CPU 20 records corrected position information of the focus lens group FL, the zoom lens group ZL, and the iris I and corrected position information of the tilt correction lens group 34 in a status where the qualities of the images of the areas are set to be uniformized in the EEPROM 28 (step S118). The corrected position information is determined by the CPU 20 based on the output values of the potentiometers FP, ZP, IP, and 34P of the optical system. By doing this, a procedure of eccentricity correction in the lens apparatus 20 ends.

Next, a procedure of a case in which the lens apparatus 20 is mounted in the camera main body 40 to actually capture an image will be described.

When a power of the lens apparatus 20 is activated, the CPU 20 reads out the corrected position information from the EEPROM 28 (step S120).

Next, the CPU 20 drives the motors FM, ZM, IM, and 34M based on the read-out corrected position information (step S122). By doing this, the lens apparatus 20 is set to be a capturing available status.

According to the lens apparatus 10 of the present invention, the eccentricity may be adjusted using a single body of the lens apparatus without mounting the lens apparatus 10 in the camera main body 40. Further, even when the maintenance is performed while the lens apparatus 10 is separated from the camera main body 40, the alignment correction may be performed using the single body of the lens apparatus 10 so that the usability is good.

Next, a modification embodiment of the configuration of the lens apparatus 10 will be described.

Figure 7:
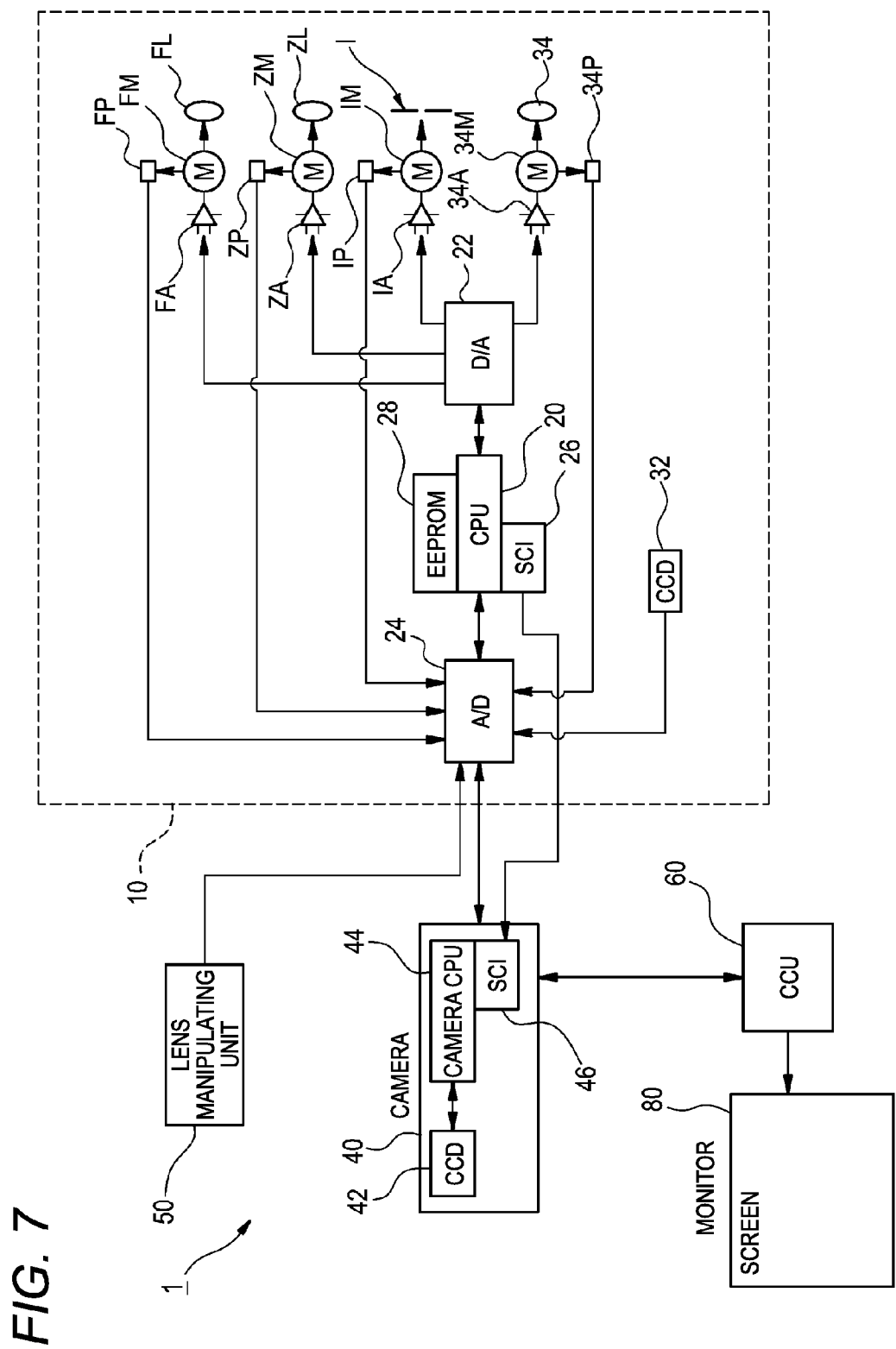
FIG. 7 is a block diagram illustrating another configuration example of a camera system which includes a lens apparatus.

FIG. 7 illustrates another configuration example of the lens apparatus 10. Basically, the camera system 1 of FIG. 7 is basically the same as the camera system illustrated in FIG. 1. Hereinafter, a different configuration from the configuration of FIG. 1 will be described and description of a common configuration or common members with the above-described lens apparatus 10 will be appropriately simplified or omitted.

The lens apparatus 10 includes one CCD 32 for focus detection.

Figure 8:
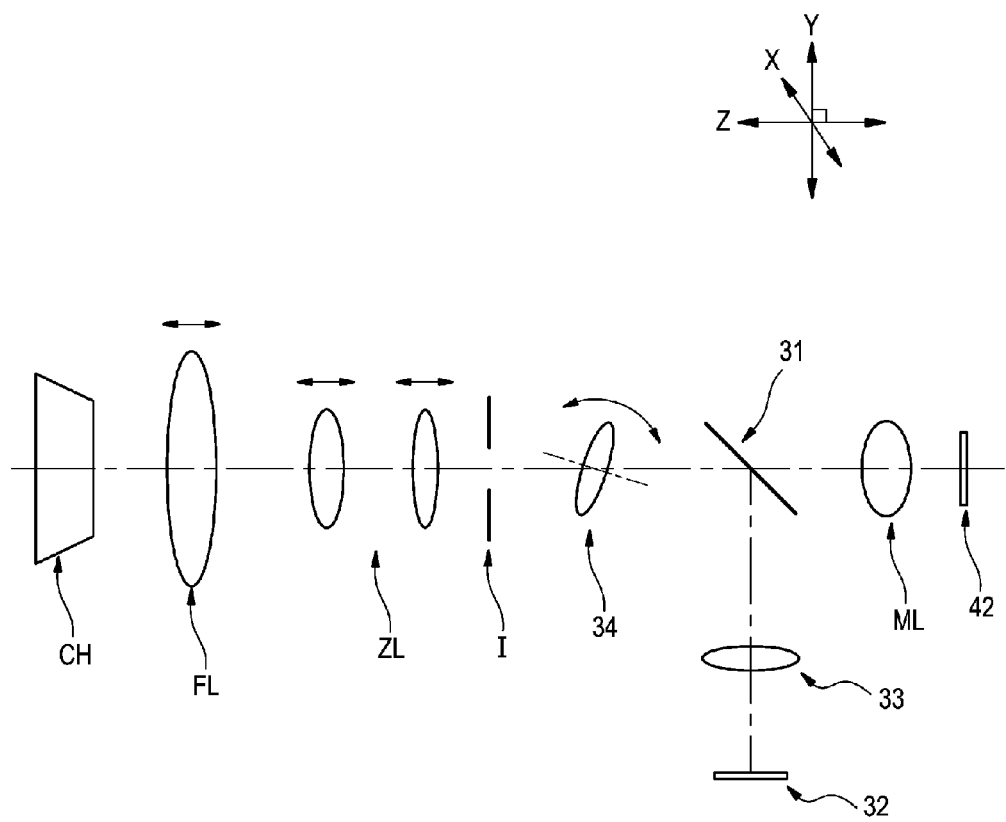
FIG. 8 is a diagram schematically illustrating an optical system of the camera system of FIG. 7.

FIG. 8 illustrates an optical system of the lens apparatus 10 of FIG. 7. In the optical system, a focus lens group FL, a zoom lens group ZL, an iris I, a tilt correction lens group 34, a beam splitter 31, and a master lens group ML are provided in this order from the subject toward the image capturing surface, which is common to the above-described lens apparatus 10.

In the second optical path, a collecting lens 33 which collects light reflected by the beam splitter 31 is provided and the CCD 32 is provided in an image formation position of a light flux which transmits the collecting lens 33. The CCD 32 is used to correct an eccentricity.

Figure 9:
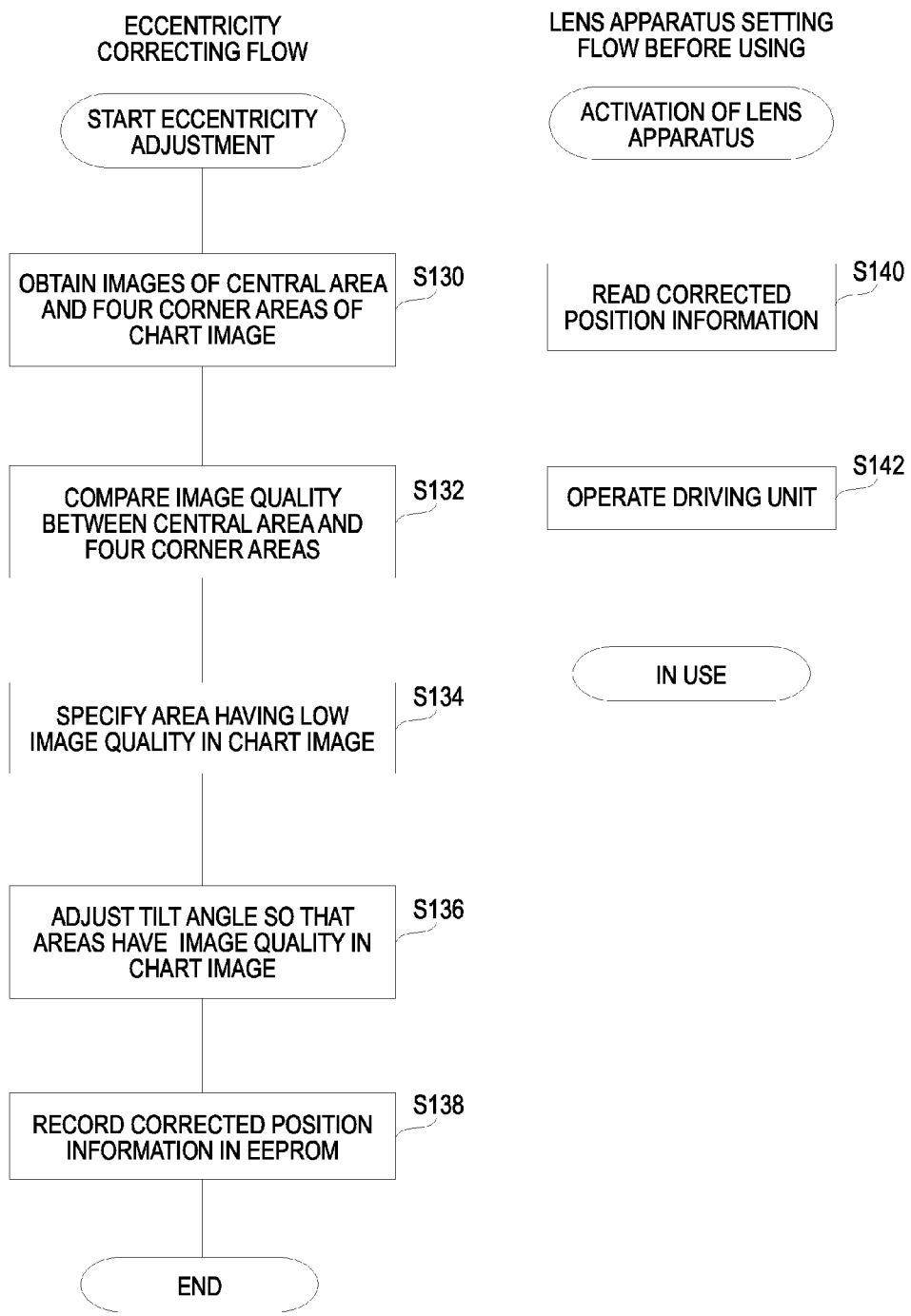
FIG. 9 is a flowchart illustrating a procedure of performing alignment in the lens apparatus of FIG. 7.
Figure 10:
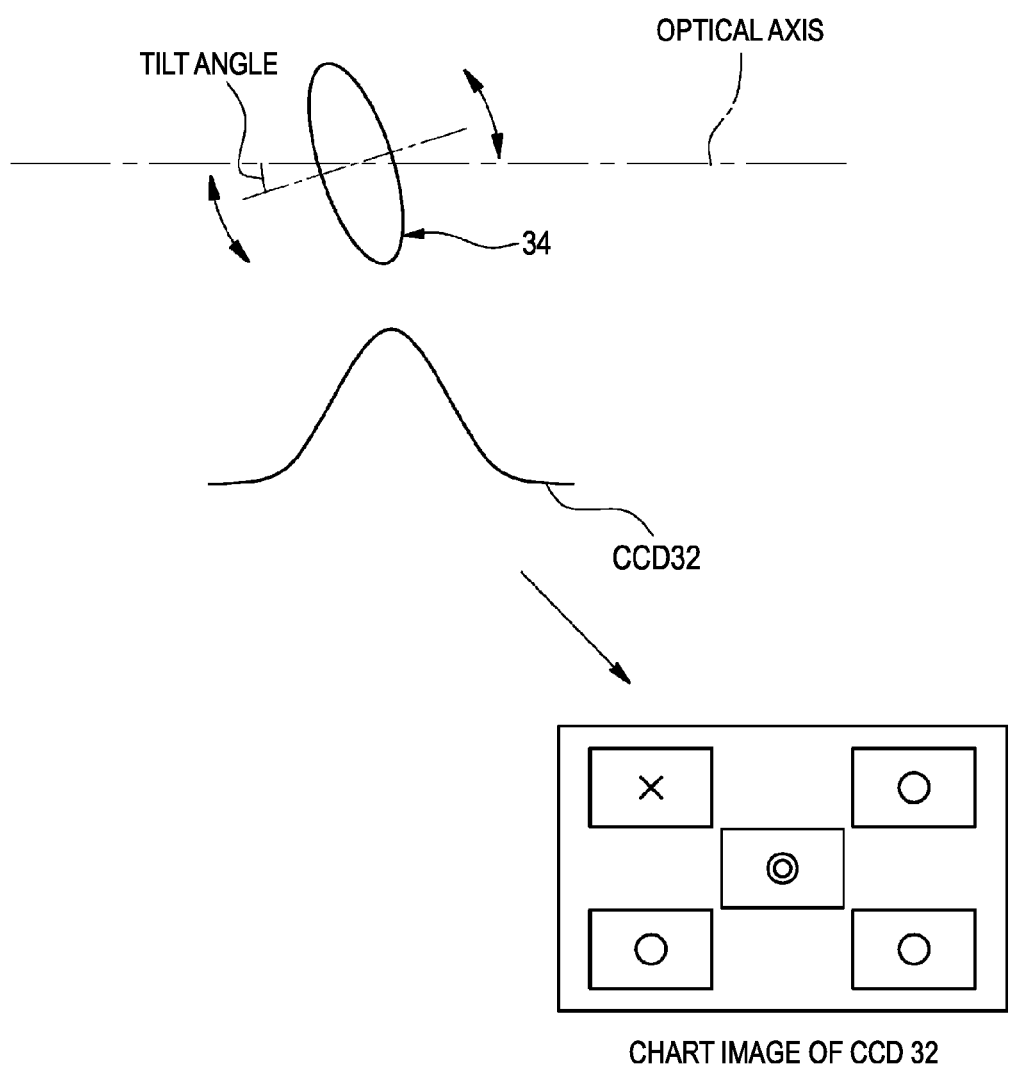
FIG. 10 is a diagram illustrating a method of setting a tilt angle of a tilt correction lens group based on a chart image in the lens apparatus of FIG. 7.

FIG. 9 is a flowchart illustrating a procedure of correcting an eccentricity by the lens apparatus of FIG. 7. FIG. 10 is a diagram illustrating a method of setting a tilt angle of a tilt correction lens group 34 based on the chart image obtained from the CCD 32.

First, when the eccentricity is corrected by the control of the CPU 20, as illustrated in FIG. 8, the lens apparatus 10 captures an image quality evaluation chart CH using the CCD 32 to obtain a chart image. In this case, a total of five images from a central area and four corner areas are obtained among the chart images obtained by the CCD 32 (step S130). The CPU 20 calculates values of contrasts of the image of the central area and images of the four corner areas. In this example, the value of the contrast is used as an evaluation value.

Thereafter, the CPU 20 compares the image of the central area with the images of the other corner areas based on the evaluation values calculated in the respective areas (step S132).

Referring to FIG. 10, the contrast of the image in the central area is the highest and the contrasts of the images in an upper right area, a lower right area, and a lower left area are the next highest, and the contrast of an image in an upper right area is the lowest. In FIG. 10, the contrast of the image in the upper left area is lower than the contrast of the image in the central area and the difference between the contrasts departs from a predetermined range so that an image quality in the upper left area is determined to be bad and is represented by "x". In the meantime, the contrasts of the images in the upper right area, the lower right area, and the lower left area are lower than the contrast of the image in the central area but the difference therebetween is within the predetermined range so that the qualities of the images in the upper right area, the lower right area, and the lower left area are determined to be in the allowable range and is represented by "○".

Here, the comparison of the images in the respective areas is performed based on a predetermined threshold value, as described above. Further, a method of comparing the images in the areas is not limited to the method that uses the threshold value as described above. For example, an average value of the contrasts is calculated from the contrast values of the areas to evaluate qualities of the images of the areas based on the average value.

The CPU 20 compares the qualities of the images of the areas as described above to specify an area where the image quality of the CCD 32 is the lowest (step S134). Next, the CPU 20 drives the tilt correction lens group 34 to change the tilt angle so as to increase the evaluation value of the image of the area having a low image quality so that the images of the areas are adjusted to have the substantially same image quality (step S136).

In the flowchart of FIG. 9, after adjusting the qualities of the images of the areas to be uniformized, the CPU 20 records corrected position information of the focus lens group FL, the zoom lens group ZL, and the iris I and corrected position information of the tilt correction lens group 34 in a status where the qualities of the images of the areas are set to be uniformized in the EEPROM 28 (step S138). The corrected position information is determined by the CPU 20 based on the output values of the potentiometers FP, ZP, IP, and 34P of the optical system. By doing this, a procedure of eccentricity correction in the lens apparatus 20 ends.

Next, a procedure of a case in which the lens apparatus 10 is mounted in the camera main body 40 to actually capture an image will be described.

When a power of the lens apparatus 10 is activated, the CPU 20 reads out the corrected position information from the EEPROM 28 (step S140).

Next, the CPU 20 drives the motors FM, ZM, IM, and 34M based on the read-out corrected position information (step S142). By doing this, the lens apparatus 20 is set to be a capturing available status.

According to the lens apparatus 10 of the present invention, when one CCD 32 is provided, the eccentricity may be adjusted using a single body of the lens apparatus without mounting the lens apparatus 10 in the camera main body 40. Further, even when the maintenance is performed while the lens apparatus 10 is separated from the camera main body 40, the alignment correction may be performed using the single body of the lens apparatus 10 so that the usability is good.

The tilt correction lens group described above is not limited to being driven and controlled to be tilted with respect to the optical axis but may be moved in parallel to the optical axis, which will be described below.

Next, another configuration example of the lens apparatus and the camera system will be described.

Figure 11:
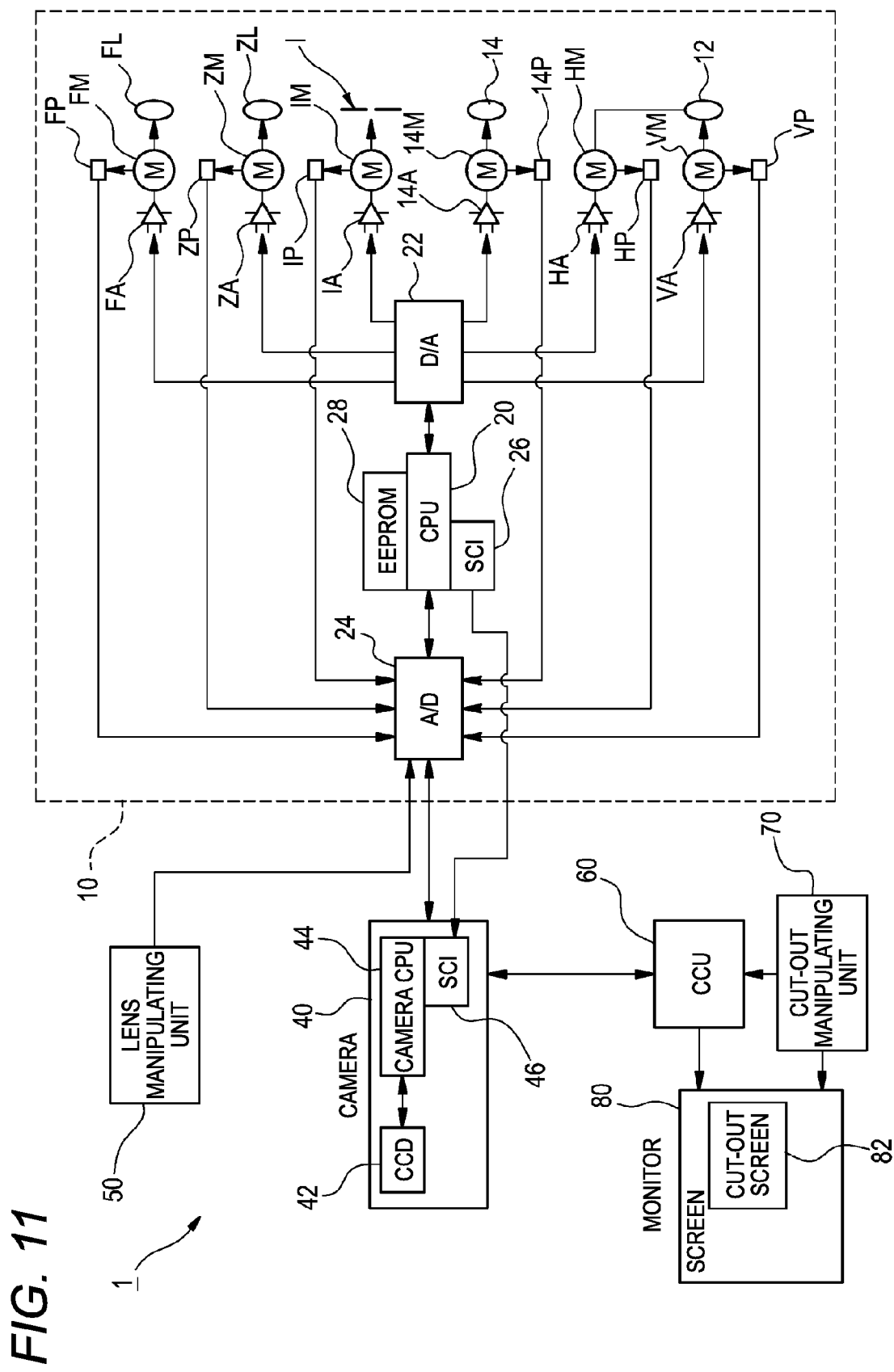
FIG. 11 is a block diagram illustrating a configuration of a camera system.
Figure 12:
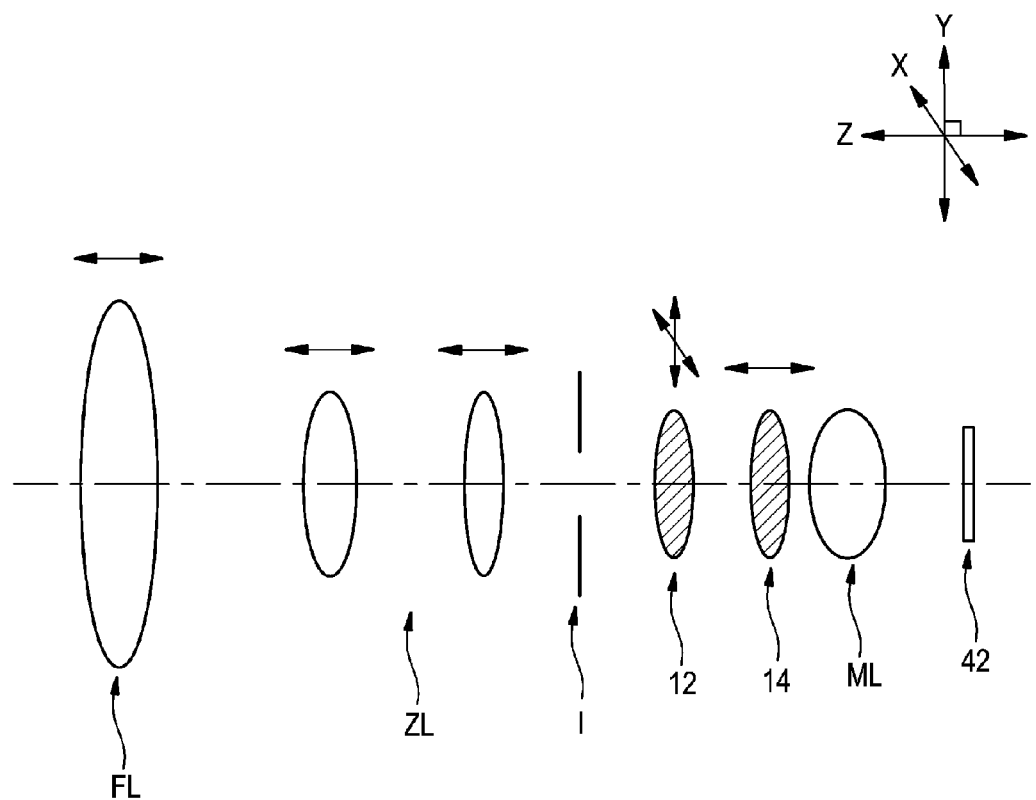
FIG. 12 is a diagram schematically illustrating an optical system of the camera system of FIG. 11.

FIG. 11 is a block diagram illustrating a main configuration of a camera system. FIG. 12 is a diagram schematically illustrating an optical system of the lens apparatus which is used for the camera system.

The optical system of the lens apparatus 10 is a photographic optical system which connects an image of a subject to an image capturing surface of an image capturing element 42 of the camera main body 40. In the optical system, a focus lens group FL, a zoom lens group ZL, an iris I, an eccentricity correction lens group 12, a tilt correction lens group 14, and a master lens group ML are provided in this order from a subject.

The focus lens group FL, the zoom lens group ZL, the iris I, and the master lens group ML are the same as described above.

The eccentricity correction lens group 12 moves to a plane (a plane parallel to an X-Y plane of FIG. 12) perpendicular to an optical axis direction. The tilt correction lens group 14 moves in parallel to the optical axis direction (a Z direction of FIG. 12). The eccentricity correction lens group 12 is driven and controlled to adjust a central position of an image which is formed on an image capturing surface of the image capturing element 42. The tilt correction lens group 14 is driven and controlled to improve an optical performance such as a resolution for entre images which are formed on the image capturing surface. The eccentricity correction lens group 12 and the tilt correction lens group 14 are also collectively called a correction lens group.

A control system of the lens apparatus 10 includes a CPU 20, an EEPROM 28, amplifiers FA, ZA, IA, HA, VA, and 14A, motors FM, ZM, IM, HM, VM, and 14M, and potentiometers FP, ZP, IP, HP, VP, and 14P.

Further, a lens manipulating unit 50, a camera main body 40, a camera controller unit CCU 60, a cut-out manipulating unit 70, and a monitor 80 which are connected to the lens apparatus 10 as external equipment also configure a control system in the whole lens system.

The cut-out manipulating unit 70 includes a manual manipulating unit such as a joy stick and the manual manipulating unit is manipulated to set or change a position of a cut-out screen which is formed by cutting a partial area of an image which is displayed on a screen of the monitor 80.

In the camera system 1, a data table in which position information of the movable lens group and the correction lens group is associated with the optical performance is stored in the EEPROM 28 in advance. The CPU 20 of the lens apparatus 10 reads out the data table from the EEPROM 28 and controls the correction lens group based on the data table so that the cutout image has a high optical performance.

When the CPU 20 controls the correction lens group, the CPU outputs a driving signal to the amplifiers HA, VA, and 14A through a D/A converter 22. Accordingly, the motors HM, VM, and 14M which are connected to the amplifiers HA, VA, and 14A are driven at a rotational speed in accordance with a value (a voltage) of the driving signal.

The motors HM and VM are connected to the eccentricity correction lens group 12. The motor HM drives the eccentricity correction lens group 12 in an X direction in a plane perpendicular to the optical axis and the motor VM drives the eccentricity correction lens group 12 in a Y direction in a plane perpendicular to the optical axis. The motor 14M is connected to the tilt correction lens group 14 to drive the tilt correction lens group 14 in parallel (a Z direction) to the optical axis.

The potentiometers HP, VP, and 14P are provided as position acquiring units of the correction lens group. A voltage signal having a value (a value indicating an absolute position) corresponding to the X direction position of the eccentricity correction lens group 12 is output from the potentiometer HP. A voltage signal having a value (a value indicating an absolute position) corresponding to the Y direction position of the eccentricity correction lens group 12 is output from the potentiometer VP. A voltage signal having a value (a value indicating an absolute position) corresponding to the optical axis direction (the Z direction) of a position of the tilt correction lens group 14 is output from the potentiometer 14P. The voltage signals output from the potentiometers HP, VP, and 14P are given to the CPU 20 through the A/D converter 24.

The CPU 20 changes values of the driving signals which are output to the amplifiers HA, VA, and 14A to control the positions of the eccentricity correction lens group 12 and the tilt correction lens group 14 while referring to the lens position of the eccentricity correction lens group 12 and the tilt correction lens group 14, and the lens position of the movable lens group which are detected by the potentiometers HP, VP, and 14P, and the data table.

Next, a data structure of the data table will be described.

FIGS. 13A and 13B are diagrams illustrating data structures of the data tables. In the table illustrated in FIG. 13A, positions of the movable lens group and the iris and the position of the eccentricity correction lens group 12, and a resolution of an image in that case are related to each other. In the table illustrated in FIG. 13B, positions of the movable lens group and the iris and the position of the tilt correction lens group 14, and a resolution of an image in that case are related to each other.

A value indicating an absolute position of the focus lens group FL is given to a parameter "a01", "a02", "a03", . . . indicating the position information of the focus lens group FL. A value indicating an absolute position of the zoom lens group ZL is given to a parameter "b01", "b02", "b03", . . . indicating the position information of the zoom lens group ZL. A value indicating an iris position of the iris I is given to a parameter "c01", "c02", "c03" . . . indicating the iris position of the iris I. A number such as "0", "−1", or "+1" is given to the parameter.

A value indicating a position in a plane perpendicular to the optical axis of the eccentricity correction lens group 12 is given to a parameter "d01", "d02", "d03", indicating the position information of the eccentricity correction lens group 12. The values are coordinates indicating the X direction position and the Y direction position of the eccentricity correction lens group 12.

A value indicating a position in the optical axis direction of the tilt correction lens group 14 is given to a parameter "e01", "e02", "e03", . . . indicating the position information of the tilt correction lens group 14. The values are a number such as "−1" or "+1" indicating the Z direction position when a reference position of the optical axis direction is "0".

The resolution is a value indicating a resolution of an image which is captured based on the corresponding parameters of the movable lens group and the correction lens group. As the value of the resolution becomes higher, the optical performance is higher and as the value of the resolution becomes lower, the optical performance is lower.

In the above-described data table, the resolution is used as an index indicating the optical performance, but the present invention is not limited thereto and may use a modulation transfer function (MTF).

Further, the above-described data table has a data structure in which a table created by associating the positions of the movable lens group and the iris with the position of the eccentricity correction lens group 12 and a table created by associating the positions of the movable lens group and the iris with the position of the tilt correction lens group 14 are separated. However, the data structure of the data table is not limited thereto but may be a data structure having one table created by associating the positions of the movable lens group and the iris with the positions of the eccentricity correction lens group 12 and the tilt correction lens group 14.

Next, a meaning of adjusting a quality of a cutout image cut from the whole image will be described.

Figure 14:
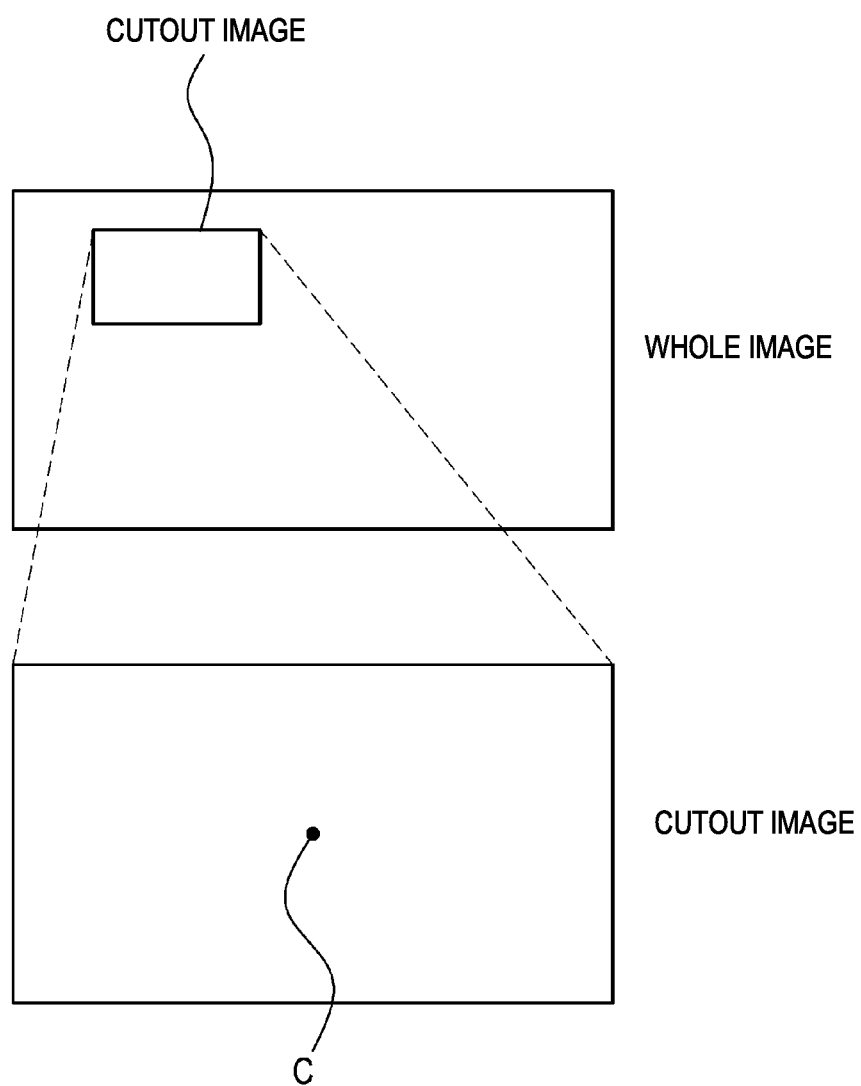
FIG. 14 is a diagram illustrating a whole image and a cutout image.

FIG. 14 is a diagram illustrating a whole image and a cutout image.

During trimming or electronic zoom, when it is assumed that an image which is generated based on image information obtained by a CCD 42 of a camera main body 40 is a whole image, a process of cutting out an image in a partial area of the whole image to display the cutout image on a part of the whole image or a process of magnifying only the cutout image to be displayed on the whole screen of a monitor 80 is performed. In this case, even though a quality of the whole image is good, if a quality of the cutout image is not sufficiently good, a visibility of a user is lowered by performing the processes. Generally, in an optical system which includes an image capturing lens, an optical performance at a center of the whole image is high and an optical performance is lowered in the vicinity areas as compared with the center. Therefore, if an image is cutout from the vicinity area of the whole image, a quality of the cutout image is lower than the quality of the whole image. When an image processing such as trimming or electronic zoom is performed, it is important to make the quality of the cutout image be higher than the quality of the whole image.

Therefore, when an image is captured, the camera system 1 drives and controls the eccentricity correction lens group 12 to have an optical performance in which a quality of the center C of the cutout image is high and drives and controls the tilt correction lens group 14 to have an optical performance in which a quality of the whole cutout image is high.

In the meantime, directions in which the eccentricity correction lens group 12 and the tilt correction lens group 14 are driven are uniformly determined by a configuration of the lens which includes a movable lens group such as a focus lens group FL or a zoom lens group ZL. When the data table is created, the driving direction and the driven amount of the eccentricity correction lens group 12 and the tilt correction lens group 14 may be actually measured in accordance with the configuration of the lens of the optical system which is actually mounted and data created by associating the obtained value with the positions of the movable lens group and the iris and the optical performance (here, a resolution) at that time.

Next, a procedure of adjusting a quality of the cutout image will be described.

Figure 15:
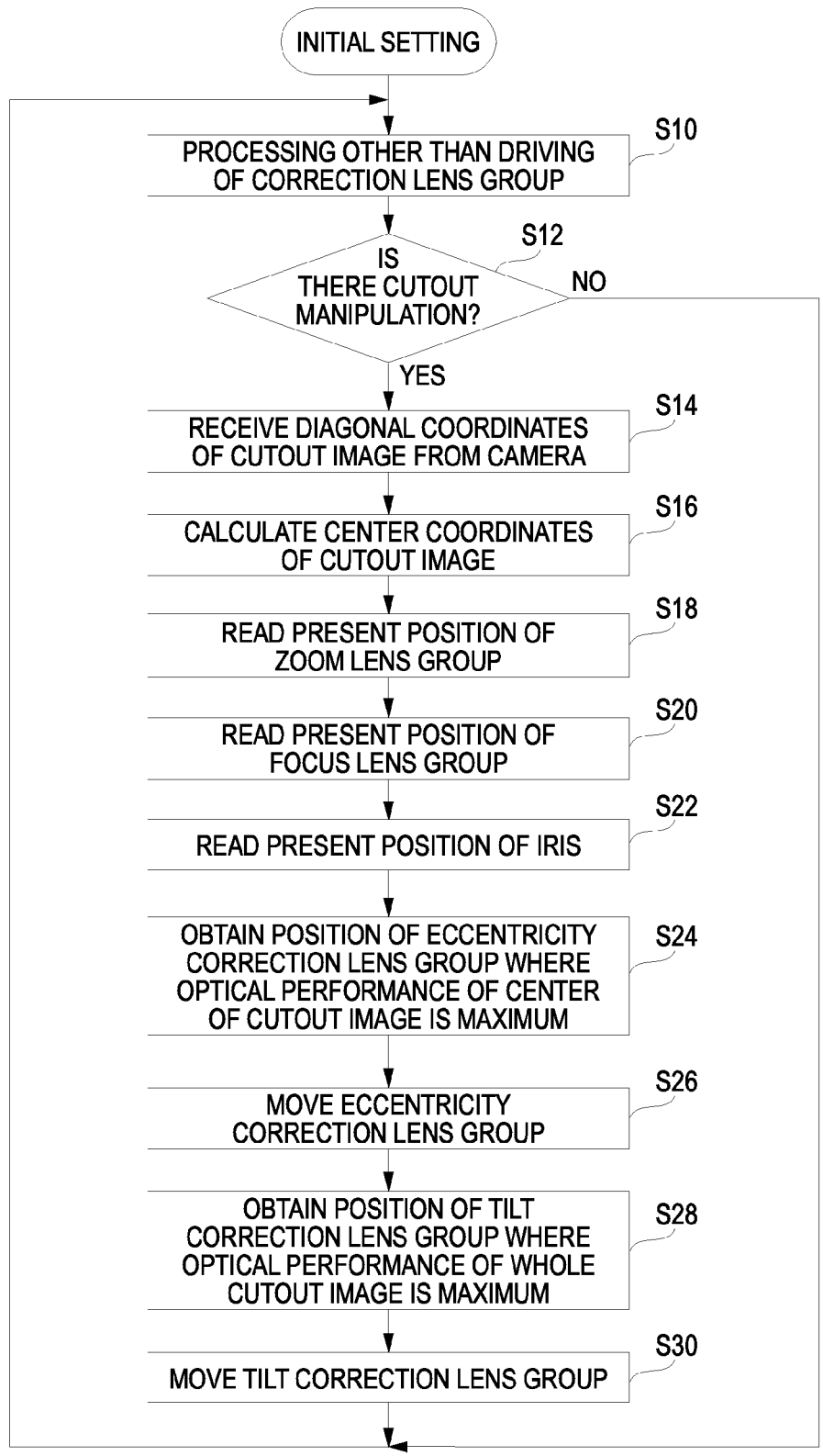
FIG. 15 is a flowchart illustrating a procedure of adjusting an image quality using a correction lens group in the camera system of FIG. 11.

FIG. 15 is a flowchart illustrating a procedure of adjusting a quality of the cutout image by the correction lens group in the camera system of FIG. 1. In the following description, the configuration of the camera system 1 of FIG. 11 will be appropriately referred.

At first, the movable lens group, the iris, and the correction lens groups are set in predetermined initial positions.

Focus manipulation or zoom manipulation is performed (step S 10). Here, manipulation other than the driving of the correction lens group is appropriately performed.

Next, it is detected whether to perform manipulation to cutout an image from a whole image obtained from the camera main body 40 (step S12). Whether to perform the cutout manipulation is determined by a camera CPU 44 of the camera main body 40 based on an input signal from the cut-out manipulating unit 70. When the cutout manipulation is detected, as it will be described in a following step, a flow of adjusting the quality of the cutout image by controlling the correction lens group is performed. When the cutout manipulation is not detected, without performing the flow of adjusting the quality of the cutout image by controlling the correction lens group, a status of the lens apparatus 10 in step S10 is maintained.

In the flow of adjusting the quality of the cutout image, the CPU 20 of the lens apparatus 10 reads out diagonal coordinates of the cutout image from the camera main body 40 (step S14). Next, the CPU 20 calculates center coordinates of the cutout image based on the diagonal coordinates (step S16). By doing this, the CPU 20 may specify the position of the cutout image in the whole image.

Next, the CPU 20 reads an output value of the potentiometer ZP to detect the position of the zoom lens group ZL at a present moment (step S18), reads an output value of the potentiometer FP to detect the position of the focus lens group FL at a present moment (step S20), and reads an output value of the potentiometer IP to detect the position of the iris I at a present moment (step S22). A procedure of performing steps S18, S20, and S22 is not limited to the above procedure, but the procedure may be appropriately changed or the steps may be simultaneously performed.

Next, the CPU 20 refers to the data table which is stored in the EEPROM 28 in advance to obtain the position of the eccentricity correction lens group 12 in which the optical performance (here, a resolution) of the center of the cutout image is maximum based on the positions of the focus lens group FL, the zoom lens group ZL, and the iris I (step S24). The CPU 20 drives and controls the eccentricity correction lens group 12 in accordance with the obtained position of the eccentricity correction lens group 12 (step S26).

Further, the CPU 20 refers to the data table which is stored in the EEPROM 28 in advance to obtain the position of the tilt correction lens group 14 in which the optical performance (here, a resolution) of the whole cutout image is maximum based on the positions of the focus lens group FL, the zoom lens group ZL, and the iris I (step S28). The CPU 20 drives and controls the tilt correction lens group 14 in accordance with the obtained position of the tilt correction lens group 14 (step S30).

By doing this, the camera system 1 drives and controls the eccentricity correction lens group 12 and the tilt correction lens group 14 of the lens apparatus 10 to improve the quality of the cutout image.

Next, another configuration example of the camera system will be described with reference to FIG. 16. When a face frame is set in a human image of a subject in a whole image by face recognition, a camera system drives and controls the correction lens group to adjust an image quality in the face frame.

Figure 16:
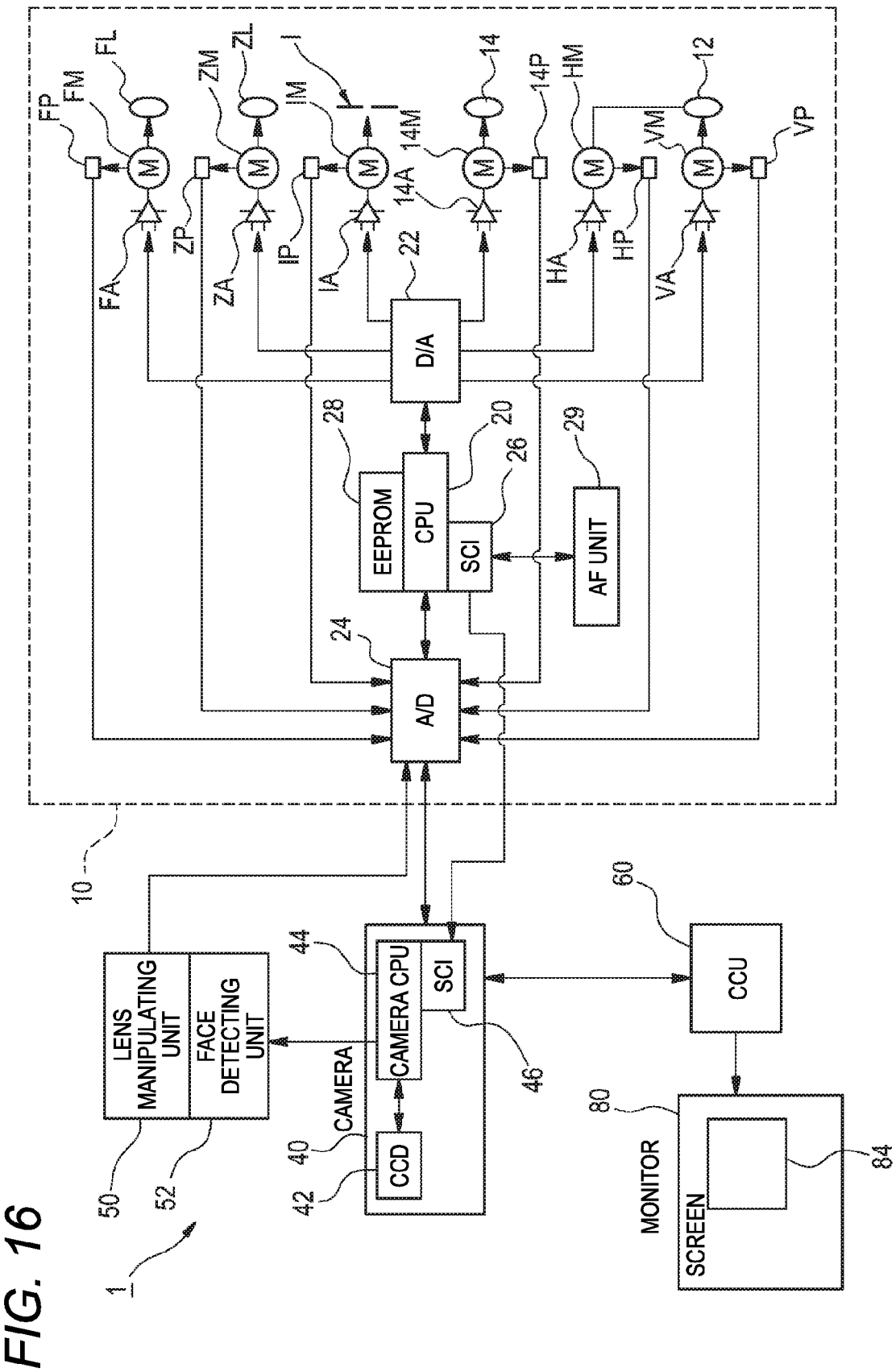
FIG. 16 is a block diagram illustrating another configuration example of a camera system.

Basically, the camera system 1 of FIG. 16 is the same as the camera system illustrated in FIG. 11. Hereinafter, different parts from the configuration of FIG. 11 will be described.

An AF unit 29 is provided in the lens apparatus 10. The AF unit 29 is connected to the CPU 20 by an SCI 26.

Further, the camera system 1 includes a face detecting unit 52. The face detecting unit 52 is controlled by a camera CPU 44. However, the camera system 1 does not include a cut-out manipulating unit.

Even though not illustrated, the AF unit 29 includes an AF processing unit and an AF image capturing circuit. The AF image capturing circuit is disposed in the lens apparatus 10 in order to obtain a video signal for processing an AF and includes an image capturing element (called an AF image capturing element) such as a CCD or a processing circuit which outputs an output signal of the AF image capturing element as a predetermined format of video signal. In the meantime, the video signal which is output from the AF image capturing circuit is a brightness signal.

An image of subject light which is split from subject light which is incident onto the image capturing element of the camera main body 40 by a half mirror which is disposed on an optical path of an optical system is formed on an image capturing surface of the AF image capturing element. A photographing range for an image capturing area and a subject distance (a distance to the subject which is in focus) of the AF image capturing element are configured to match a photographing range for an image capturing area and a subject distance of the image capturing element of the camera main body 40. Further, a subject image which is accepted by the AF image capturing element matches with a subject image which is accepted by the image capturing element of the camera main body 40. However, both photographing ranges do not need to perfectly match each other. For example, the photographing range of the AF image capturing element may be larger so as to include the photographing range of the image capturing element of the camera main body 40.

The AF processing unit obtains a video signal from the AF image capturing circuit to calculate a focus evaluation value which indicates a height of a contrast of a subject image based on the video signal. For example, the AF processing unit extracts a high frequency component signal of the video signal obtained from the AF image capturing element using a high pass filter and then integrates a signal in a range corresponding to an AF area which is a target of the AF among the high frequency component signals for every screen (one frame). By doing this, the integrated value which is obtained for every screen indicates a height of the contrast of the subject image and is given to the CPU as the focus evaluation value.

The CPU 20 obtains information (AF frame information) of the AF frame which indicates a range (contour) of the AF area through the camera CPU 44 and designates a range within the AF frame which is designated by the AF frame information as an AF area by the AF processing unit. Further, the focus evaluation value which is obtained by an image (the video signal) in the AF area is obtained from the AF processing unit.

By doing this, whenever the video signal for one screen is obtained from the AF image capturing circuit (whenever the focus evaluation value is obtained in the AF processing unit), the focus evaluation value is obtained from the AF processing unit and also the focus lens group FL is controlled such that the obtained focus evaluation value is maximum, that is, the contrast of the subject image in the AF area is maximum. For example, a climbing method is generally known as a control method of a focus lens group FL based on the focus evaluation value and if a point at which the focus evaluation value begins to be reduced is detected while moving the focus lens group FL in a direction where the focus evaluation value is increased, the focus lens group FL is set in position. By doing this, the subject within the AF frame is automatically in focus.

The face detecting unit 52 performs face authentication on a subject figure in the captured subject image. If the subject figure is recognized as a subject (an subject to be focused) which is set to be automatically focused in advance, the face detecting unit 52 performs automatic focus control on the lens apparatus 10 through the AF unit 29.

Further, as a result of the face authentication by the face detecting unit 52, when a specific figure is recognized, the camera CPU 44 displays the face frame 84 in accordance with the subject figure in the subject image on the monitor 80 through the CCU 60.

In the camera system 1, a data table in which position information of the movable lens group and the correction lens group are associated with the optical performance is stored in the EEPROM 28 in advance. The CPU 20 of the lens apparatus 10 reads out the data table from the EEPROM 28 and controls the correction lens group based on the data table so that the image in the face frame 84 has a high optical performance.

In the meantime, the data structure of the data table is as described above.

Next, a meaning of adjusting an image quality in the face frame 84 in the whole image will be described.

Figure 17:
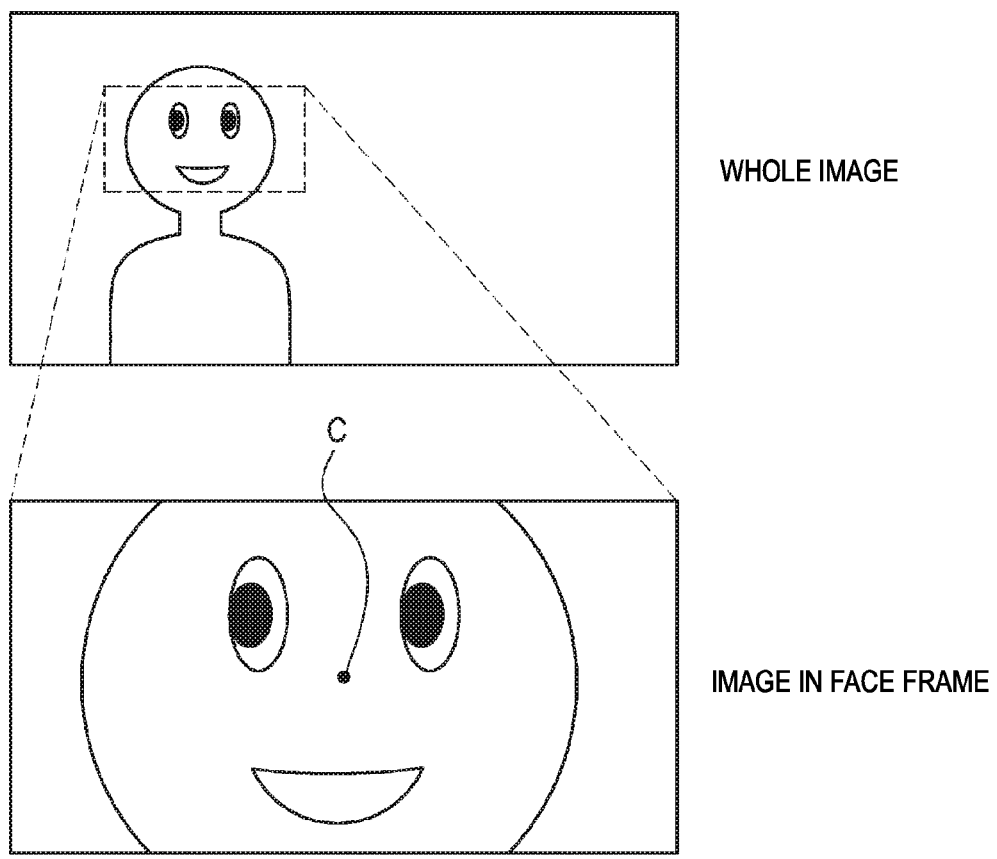
FIG. 17 is a diagram illustrating a whole image and an image in a face frame.

FIG. 17 is a diagram illustrating a whole image and an image in a face frame. The image in the face frame 84 is a subject to be photographed by a photographer so that the image in the face frame 84 is processed so as to be magnified to be displayed on the monitor 80 in many cases. In this case, even though a quality of the whole image is good, if an quality image in the face frame 84 is not sufficiently good, a visibility of a user is lowered by performing the processes. Generally, in an optical system which includes an image capturing lens, an optical performance at a center of the whole image is high and an optical performance is lowered in the vicinity areas as compared with the center. Therefore, if the face frame 84 is set in a vicinity portion of the whole image, an image quality in the face frame 84 becomes lower than the quality of the whole image. In the face recognition, it may be considered that it is important to increase the image quality in the face frame 84 rather than the quality of the whole image in some cases.

Therefore, when an image is photographed, the camera system 1 drives and controls the eccentricity correction lens group 12 to have an optical performance in which a quality of the center C of the image in the face frame 84 is high and drives and controls the tilt correction lens group 14 to have an optical performance in which a quality of the whole image in the face frame 84 is high.

Next, a procedure of adjusting an image quality in the face frame will be described.

Figure 18:
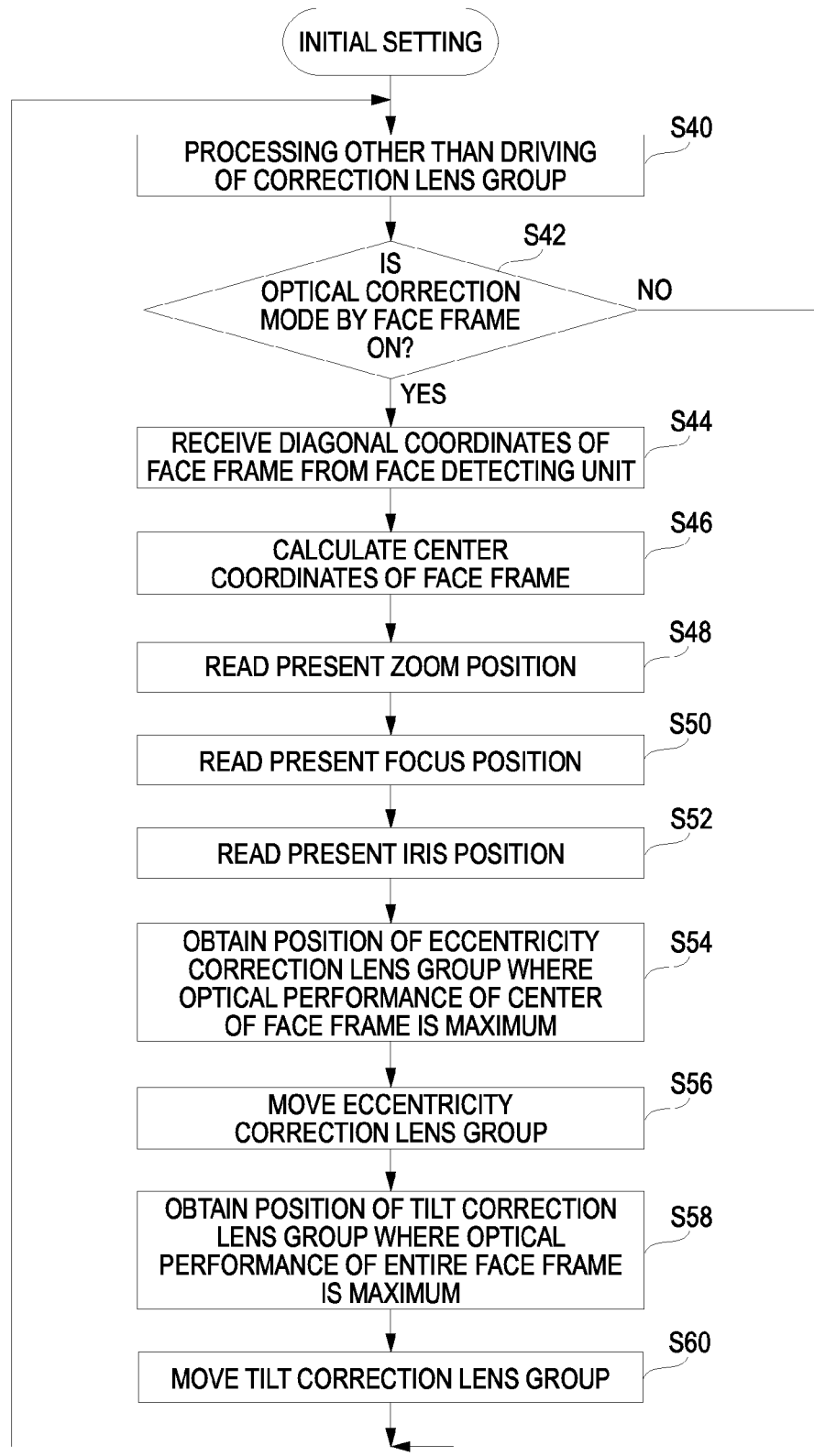
FIG. 18 is a flowchart illustrating a procedure of adjusting an image quality using a correction lens group in the camera system of FIG. 16.

FIG. 18 is a flowchart illustrating a procedure of adjusting an image quality in the face frame by the correction lens group in the camera system of FIG. 16. In the following description, the configuration of the camera system 1 of FIG. 16 will be appropriately referred.

At first, the movable lens group, the iris, and the correction lens groups are set in predetermined initial positions.

Focus manipulation or zoom manipulation is performed (step S40). Here, manipulation other than manipulation of driving the correction lens group is appropriately performed.

Next, it is detected whether a mode which corrects the image in the face frame set by the face recognition is set (step S42). The mode which corrects the image in the face frame may be set, for example, by selecting on or off in the lens manipulating unit 50 or the camera main body 40. Further, the camera CPU 44 determines whether to detect the mode which corrects the image in the face frame. When the mode which corrects the image in the face frame is on, as it will be described in following steps, a flow of adjusting an image quality in the face frame 84 by controlling the correction lens group is performed. When the mode which corrects the image in the face frame is off, the photographing status of the lens apparatus 10 in step S40 is maintained without performing the flow of adjusting an image quality in the face frame 84 by controlling the correction lens group.

In the flow of adjusting the image quality in the face frame 84, the CPU 20 of the lens apparatus 10 reads out diagonal coordinates of the face frame 84 in the whole image from the camera main body 40 (step S44). Next, the CPU 20 calculates center coordinates of the image in the face frame 84 based on the diagonal coordinates (step S46). By doing this, the CPU 20 may specify the position of the image in the face frame 84 in the whole image.

Next, the CPU 20 reads an output value of the potentiometer ZP to detect the position of the zoom lens group ZL at a present moment (step S48), reads an output value of the potentiometer FP to detect the position of the focus lens group FL at a present moment (step S50), and reads an output value of the potentiometer IP to detect the iris position of the iris I at a present moment (step S52). A procedure of performing steps S48, S50, and S52 is not limited to the above procedure, but the procedure may be appropriately changed or the steps may be simultaneously performed.

Next, the CPU 20 refers to the data table which is stored in the EEPROM 28 in advance to obtain the position of the eccentricity correction lens group 12 in which the optical performance (here, a resolution) of the center of the image in the face frame 84 is maximum based on the positions of the focus lens group FL, the zoom lens group ZL, and the iris I (step S54). The CPU 20 drives and controls the eccentricity correction lens group 12 in accordance with the obtained position of the eccentricity correction lens group 12 (step S56).

Further, the CPU 20 refers to the data table which is stored in the EEPROM 28 in advance to obtain the position of the tilt correction lens group 14 in which the optical performance (here, a resolution) of the whole image in the face frame 84 is maximum based on the positions of the focus lens group FL, the zoom lens group ZL, and the iris I (step S58). The CPU 20 drives and controls the tilt correction lens group 14 in accordance with the obtained position of the tilt correction lens group 14 (step S60).

By doing this, the camera system 1 drives and controls the eccentricity correction lens group 12 and the tilt correction lens group 14 of the lens apparatus 10 to improve the image quality in the face frame 84.

Next, another configuration example of the camera system will be described with reference to FIG. 19. The camera system 1 may divide the whole image into a plurality of areas and obtain an area having the highest contrast among the plurality of areas to drive and control the above-described correction lens group to adjust an image quality of the area having the highest contrast.

Figure 19:
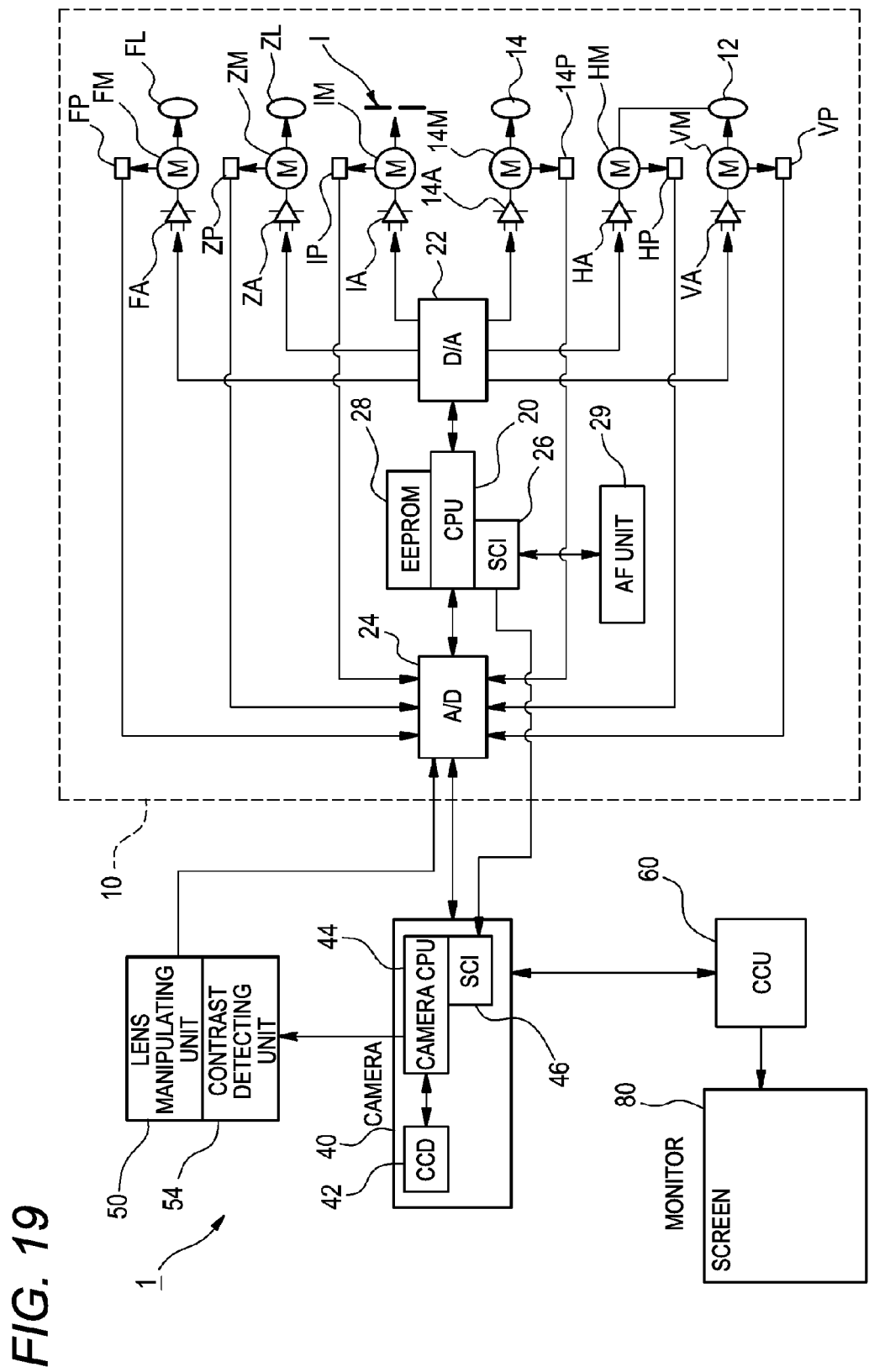
FIG. 19 is a diagram illustrating another configuration example of a camera system.

Basically, the camera system 1 of FIG. 19 is the same as the camera system illustrated in FIG. 11. Hereinafter, different parts from the configuration of FIG. 11 will be described.

The camera system 1 includes a contrast detecting unit 54. The contrast detecting unit 54 is controlled by a camera CPU 44. However, the camera system 1 does not include a cut-out manipulating unit.

Further, the camera system 1 includes an AF unit 29. The AF unit 29 is the same as the AF unit which has been already described so that the description thereof will be omitted here.

Figure 20:
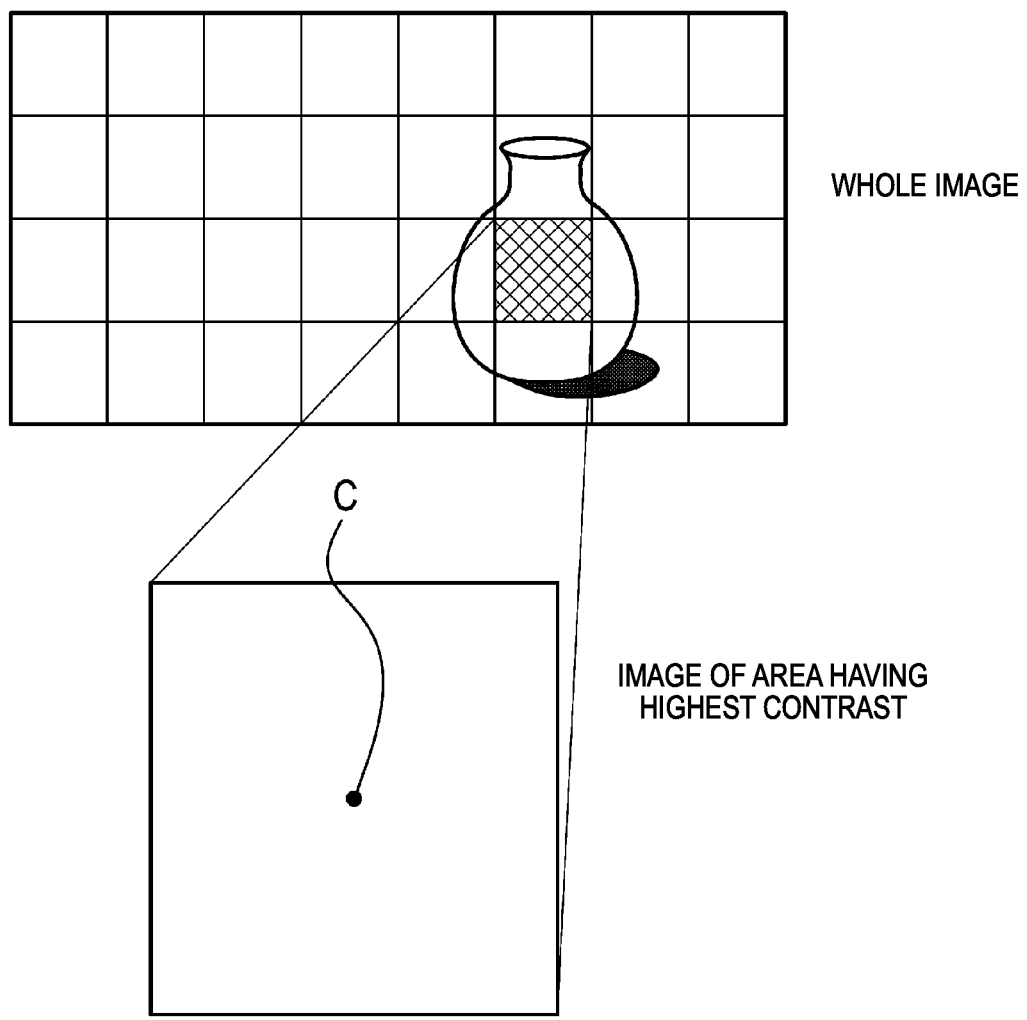
FIG. 20 is a diagram illustrating a whole image and an image of an area having the highest contrast among a plurality of areas obtained by dividing the overall image.

FIG. 20 is a diagram illustrating a whole image and an image of an area having the highest contrast among a plurality of areas obtained by dividing the whole image.

The contrast detecting unit 54 includes an image processing unit which is not illustrated and divides the image obtained by capturing an image from camera main body 40 into a plurality of areas and calculates values of contrasts of the plurality of areas. Further, the contrast detecting unit 54 generates coordinate information for every divided area to manage information created by associating the area and the coordinate information with the value of the contrast.

Next, a meaning of adjusting an image quality of an area having the highest contrast among the plurality of areas obtained by dividing the whole image will be described.

For example, in an auto focus mode, a subject image which is desired to be photographed by a photographer in the whole image is focused so that the optical performance of the subject image is desirably the highest. When the subject image is not focused, a contrast of an area including the subject image in the whole image tends to be high. When an image is photographed, the camera system 1 drives and controls the eccentricity correction lens group 12 to have an optical performance in which a quality of the center C of the image of the area having the highest contrast is high and drives and controls the tilt correction lens group 14 to have an optical performance in which a quality of the whole image of the area is high.

Next, a procedure of adjusting an image quality of an area having the highest contrast will be described.

Figure 21:
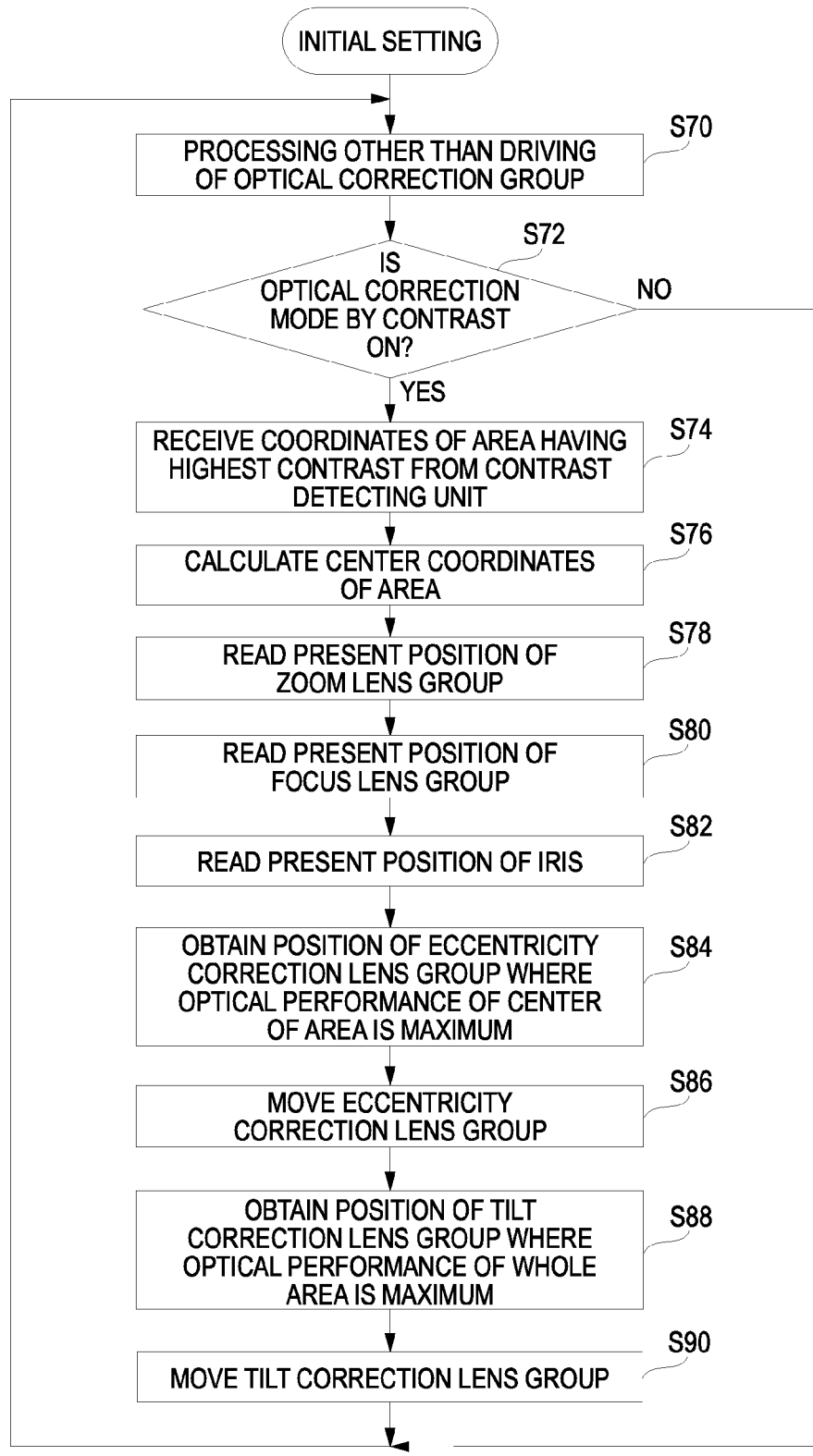
FIG. 21 is a flowchart illustrating a procedure of adjusting an image quality using a correction lens group in the camera system of FIG. 19.

FIG. 21 is a flowchart illustrating a procedure of adjusting an image quality of the area having the highest contrast by the correction lens group in the camera system of FIG. 19. In the following description, the configuration of the camera system 1 of FIG. 19 will be appropriately referred.

At first, the movable lens group, the iris, and the correction lens groups are set in predetermined initial positions.

Focus manipulation or zoom manipulation is performed (step S70). Here, manipulation other than the driving of the correction lens group is appropriately performed.

Next, it is detected whether to set a mode which divides the image to adjust an image quality based on a contrast (step S72). The mode may be set by selecting on or off in the lens manipulating unit 50 or the camera main body 40. Further, the camera CPU 44 determines whether to detect the mode. When the mode is on, as it will be described in following steps, a flow of dividing the image to adjust an image quality based on a contrast is performed. When the mode is off, a photographing status of the lens apparatus 10 in step S70 is maintained without performing a flow of dividing the image to adjust an image quality based on a contrast.

In the flow of dividing an image to adjust an image quality based on a contrast, the camera CPU 40 controls the contrast detecting unit and the contrast detecting unit 54 divides an image obtained by the camera main body 40 into a plurality of areas to calculate a value of a contrast for every divided area. The contrast detecting unit 54 specifies an area having the largest value of contrast among the plurality of areas. The lens apparatus 10 receives coordinate information of the area having the largest value of contrast from the contrast detecting unit 54 through the camera CPU 44 (step S74). Next, the CPU 20 calculates center coordinates of the area having the largest value of contrast based on the coordinate information (step S76).

Next, the CPU 20 reads an output value of the potentiometer ZP to detect the position of the zoom lens group ZL at a present moment (step S78), reads an output value of the potentiometer FP to detect the position of the focus lens group FL at a present moment (step S80), and reads an output value of the potentiometer IP to detect the iris position of the iris I at a present moment (step S82). A procedure of performing steps S78, S80, and S82 is not limited to the above procedure, but the procedure may be appropriately changed or the steps may be simultaneously performed.

Next, the CPU 20 refers to the data table which is stored in the EEPROM 28 in advance to obtain the position of the eccentricity correction lens group 12 in which the optical performance (here, a resolution) of the center of the image of the area having the largest value of contrast is maximum based on the positions of the focus lens group FL, the zoom lens group ZL, and the iris I (step S84). The CPU 20 drives and controls the eccentricity correction lens group 12 in accordance with the obtained position of the eccentricity correction lens group 12 (step S86).

Further, the CPU 20 refers to the data table which is stored in the EEPROM 28 in advance to obtain the position of the tilt correction lens group 14 in which the optical performance (here, a resolution) of the whole image of the area having the largest value of contrast is maximum based on the positions of the focus lens group FL, the zoom lens group ZL, and the iris I (step S88). The CPU 20 drives and controls the tilt correction lens group 14 in accordance with the obtained position of the tilt correction lens group 14 (step S90).

By doing this, the camera system 1 drives and controls the eccentricity correction lens group 12 and the tilt correction lens group 14 of the lens apparatus 10 to improve the image quality of the area having the largest value of contrast.

In the example of correcting the optical performance to be maximized, the resolution or the MTF is exemplified, but the optical performance is not limited thereto. For example, as it will be described below, a characteristic other than the resolution or the MTF may be substituted therefor to control the correction lens group.

(First Example of Characteristic Other than Resolution or MTF)

A contrast evaluation value of an image is measured to drive a correction lens group so as to maximize the contrast evaluation value. In this case, information created by associating a position of a movable lens group and a position of the correction lens group with the contrast evaluation value is desirably included in a data table in advance.

(Second Example of Characteristic Other than Resolution or MTF)

An area of a portion having a high brightness in a predetermined area in an image is measured to drive a lens so as to minimize the area.

(Third Example of Characteristic Other than Resolution or MTF)

An image is divided into a plurality of areas and an area having the largest brightness value is detected to drive the lens so as to maximize a brightness of the area having the highest brightness in a screen.

(Fourth Example of Characteristic Other than Resolution or MTF)

Image analysis is performed on a contour of a subject image of an image to drive a lens so that a boundary of the contour becomes the thinnest.

(Fifth Example of Characteristic Other than Resolution or MTF)

Image analysis is performed on a shape of an image to drive a lens so that an analysis result of the shape is closest to a predetermined image analysis value (individual image analysis values depending on the type of image) (for example, if the image is determined as a face, the lens moves so as to match with an analysis value of a face and thus the lens is controlled such that the image looks most like the face).

(Sixth Example of Characteristic Other than Resolution or MTF)

The lens is controlled so as to maximize values (values which are substituted for a contrast value or an MTF) of various parameters indicating an optical performance using other evaluation values.

(Seventh Example of Characteristic Other than Resolution or MTF)

The lens is controlled so as to maximize values (values which are substituted for a contrast value or an MTF) of various parameters indicating an optical performance of a section obtained by dividing the area using other evaluation values.

Even though an example of adjusting an image quality by driving and controlling the correction lens group (eccentricity correction lens group 12 and the tilt correction lens group 14) based on the image capturing condition has been described above, a center of an image to be formed may be displaced by moving the correction lens group. Hereinafter, a lens apparatus which is configured to correct the displacement of a center of an image will be described.

Figure 22:
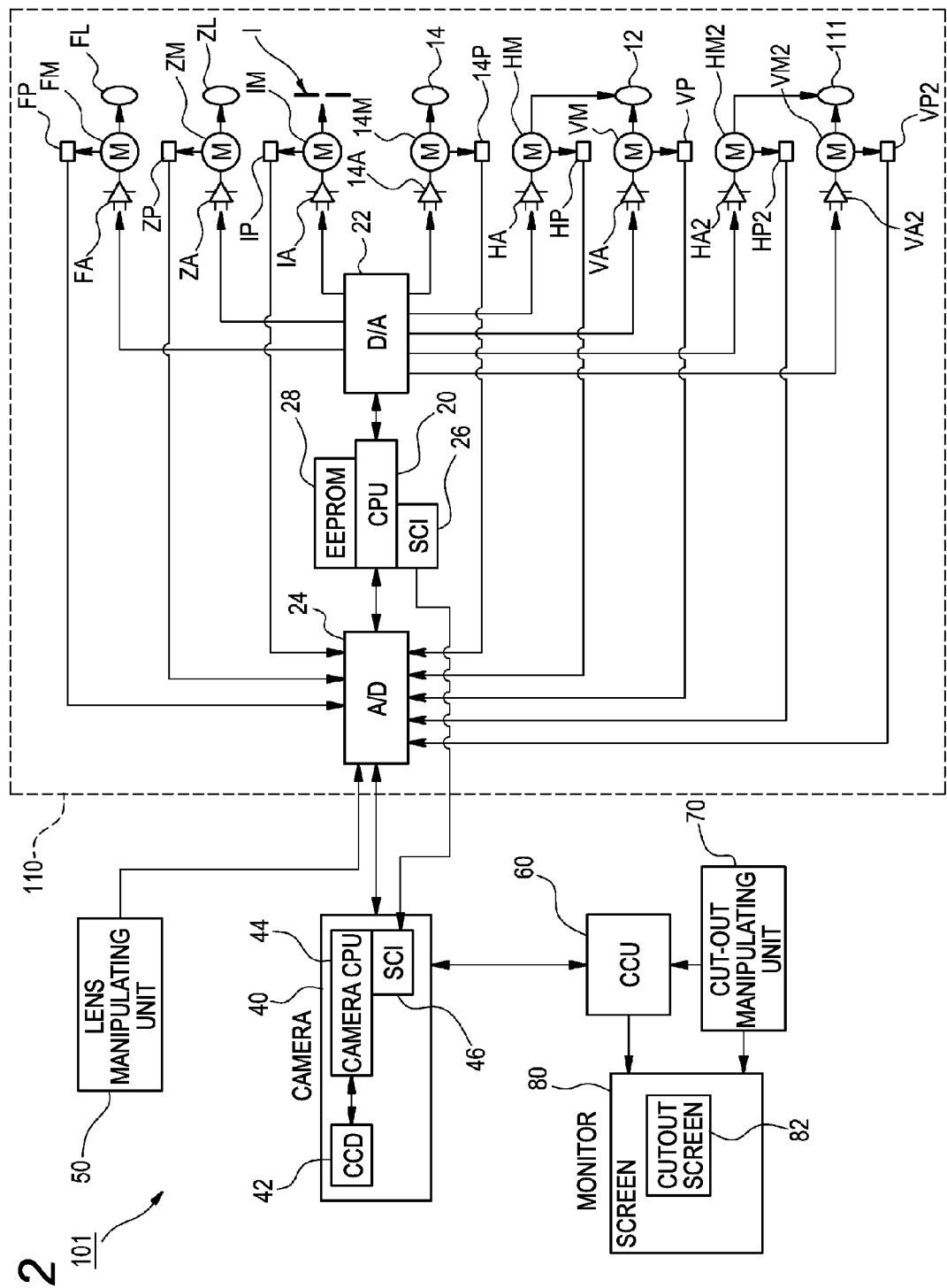
FIG. 22 is a block diagram illustrating a main configuration of another example of a camera system according to an embodiment of the present invention.
Figure 23:
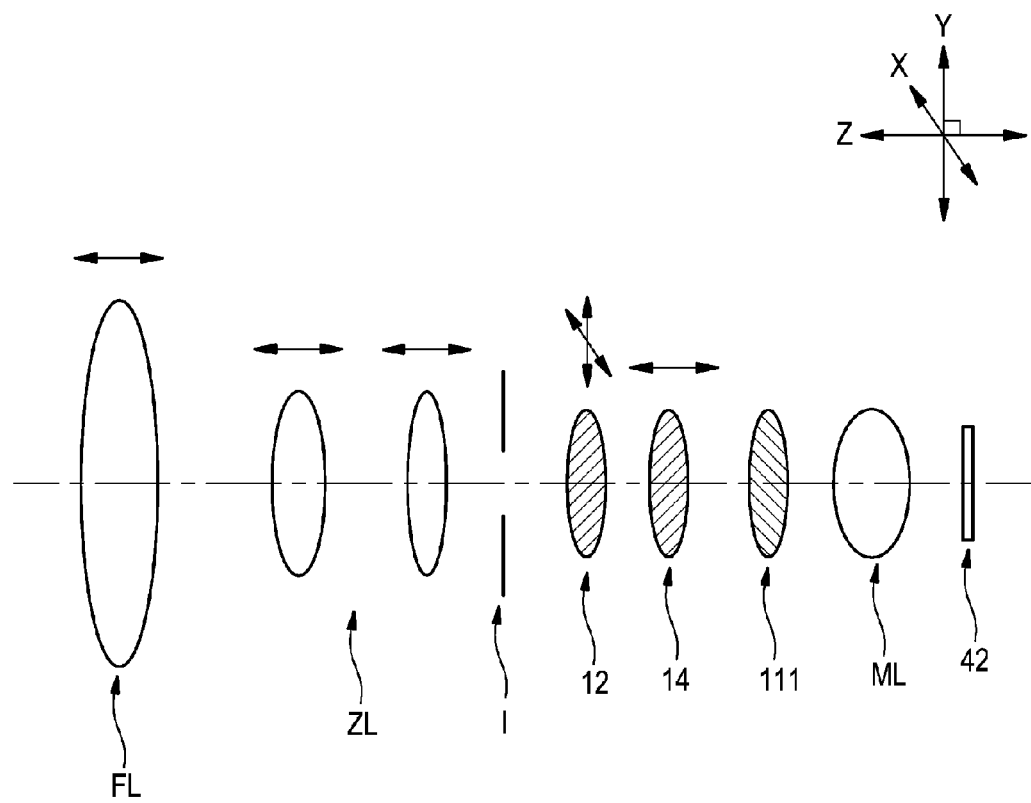
FIG. 23 is a diagram schematically illustrating an optical system of the camera system of FIG. 22.

FIG. 22 is a block diagram illustrating a main configuration of another example of a camera system according to an embodiment of the present invention and FIG. 23 is a diagram schematically illustrating an optical system of the camera system of FIG. 22. In the meantime, components which are common to the camera system illustrated in FIG. 11 are denoted by common reference numerals and description thereof will be omitted.

A camera system 101 includes a lens apparatus 110 and a camera main body 40 and the lens apparatus 110 includes a second correction lens group 111 which corrects the displacement of a center of an image due to the movement of a correction lens group which includes an eccentricity correction lens group 12 and a tilt correction lens group 14. In this example, the second correction lens group 111 is configured as a camera-shake correction lens group.

The camera-shake correction lens group 111 is provided so as to be movable in a plane (a plane parallel to an X-Y plane of FIG. 23) perpendicular to an optical axis of an optical system and the lens apparatus 110 includes motors HM2 and VM2 which drive the camera-shake correction lens group 111, amplifiers HA2 and VA2 which input driving signals to the motors HM2 and VM2, potentiometers HP2 and VP2 which obtain a position of the camera-shake correction lens group 111, and a sensor (not illustrated) which detects camera-shake.

When the CPU 20 controls the camera-shake correction lens group, the CPU 20 outputs a driving signal to the amplifiers HA2 and VA2 through a D/A converter 22. Accordingly, the motors HM2 and VM2 which are connected to the amplifiers HA2 and VA2 are driven at a rotational speed in accordance with a value (a voltage) of the driving signal.

The motor HM2 drives the camera-shake correction lens group 111 in an X direction in a plane perpendicular to the optical axis and the motor VM2 drives the camera-shake correction lens group 111 in a Y direction in a plane perpendicular to the optical axis.

A voltage signal having a value (a value indicating an absolute position) corresponding to the X direction position of the camera-shake correction lens group 111 is output from the potentiometer HP2. A voltage signal having a value (a value indicating an absolute position) corresponding to the Y direction position of the camera-shake correction lens group 111 is output from the potentiometer VP2. The voltage signals output from the potentiometers HP2 and VP2 are given to the CPU 20 through an A/D converter 24 and feedback control is performed by the CPU 20 so that the camera-shake correction lens group 111 is located in a target position.

A target position of the camera-shake correction lens group 111 is set to compensate the displacement of the center of the image due to the movement of the correction lens group and stored in an EEPROM 28 as a data table in which the target position is associated with a position of a correction lens group (an eccentricity correction lens group 12 and a tilt correction lens group 14) in advance. The CPU 20 determines the target position of the camera-shake correction lens group 111 in accordance with the position of the correction lens group (the eccentricity correction lens group 12 and the tilt correction lens group 14) by referring to the data table to perform the feedback control so that the camera-shake correction lens group 111 is located in the target position.

Next, a data structure of the data table will be described.

Figure 24:
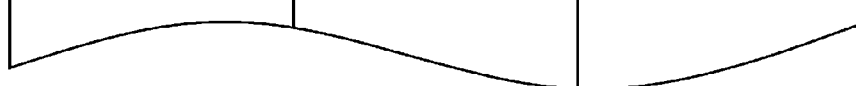
FIG. 24 is a diagram illustrating a data structure of a data table stored in a storing unit of the lens apparatus of FIG. 22.

FIG. 24 is a diagram illustrating a data structure of the data table.

A value indicating an absolute position of the eccentricity correction lens group 12 is given to a parameter "d01", "d02", "d03", . . . indicating position information of the eccentricity correction lens group 12. A value indicating an absolute position of the tilt correction lens group 14 is given to a parameter "e01", "e02", "e03", . . . indicating the position information of the tilt correction lens group 14.

A value indicating a position in a plane perpendicular to an optical axis of the camera-shake correction lens group 111 is given to a parameter "f01", "f02", "f03", . . . indicating the position information of the camera-shake correction lens group 111. The values are coordinates indicating the X direction position and the Y direction position of the camera-shake correction lens group 111.

Figure 25:
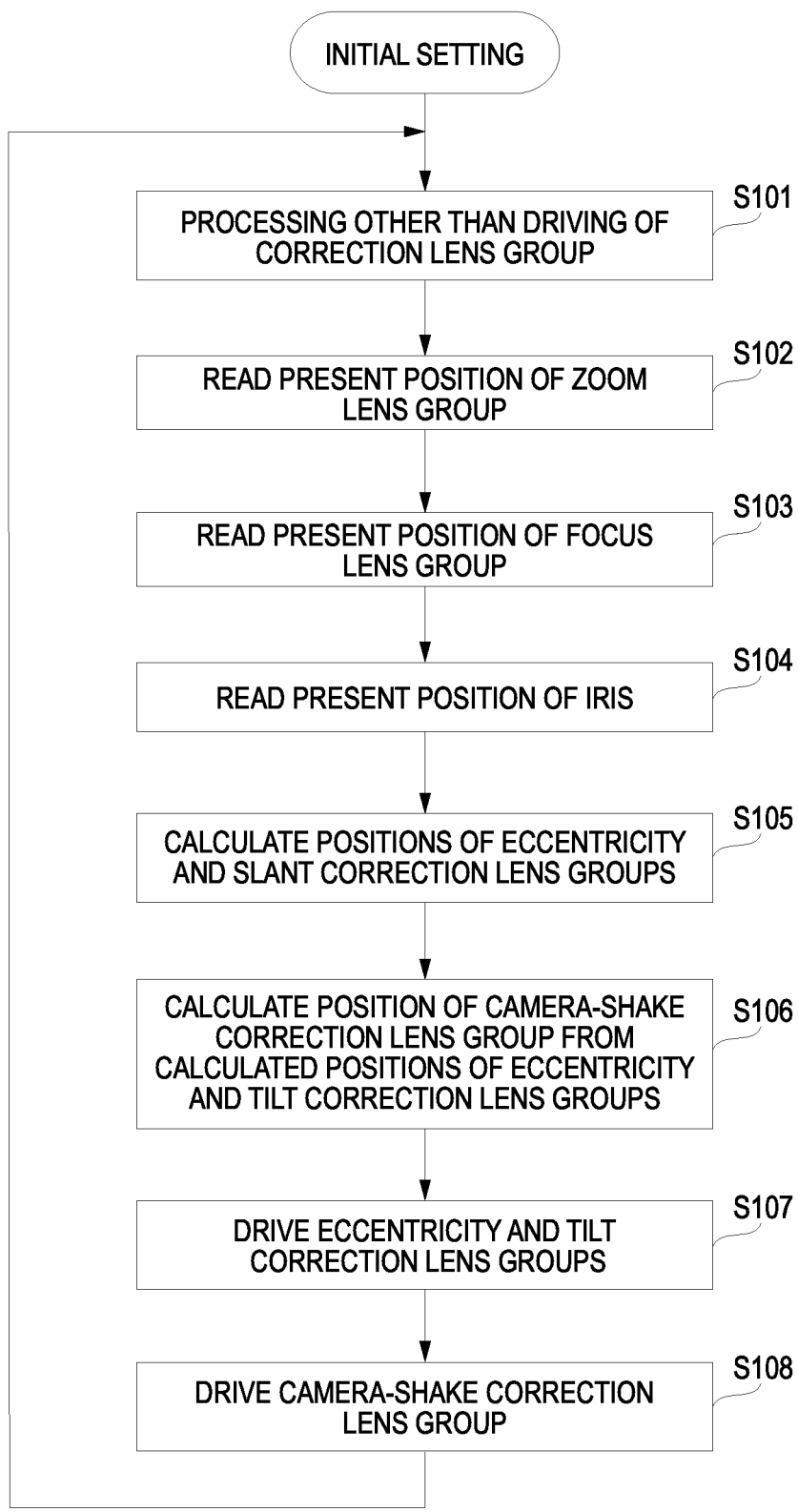
FIG. 25 is a flowchart illustrating a control process which corrects displacement of a center of an image by moving a second correction lens group of the lens apparatus of FIG. 22.

FIG. 25 is a flowchart illustrating a procedure of correcting displacement of a center of an image by driving the camera-shake correction lens group 111. In the following description, the configuration of the camera system 101 of FIG. 22 will be appropriately referred.

At first, a movable lens group, an iris, and a correction lens groups are set in predetermined initial positions.

Focus manipulation or zoom manipulation is performed (step S101). Here, manipulation other than the driving of the correction lens group and the camera-shake correction lens group is appropriately performed.

Next, the CPU 20 reads an output value of the potentiometer ZP to detect the position of the zoom lens group ZL at a present moment (step S102), reads an output value of the potentiometer FP to detect the position of the focus lens group FL at a present moment (step S103), and reads an output value of the potentiometer IP to detect the iris position of the iris I at a present moment (step S104). A procedure of performing steps S102, S103, and S104 is not limited to the above procedure, but the procedure may be appropriately changed or the steps may be simultaneously performed.

Next, the CPU 20 obtains positions of the eccentricity correction lens group 12 and the tilt correction lens group 14 based on the detected positions of the focus lens group FL, the zoom lens group ZL, and the iris I by referring to the data table (see FIGS. 13A and 13B) which is created by associating the positions of the zoom lens group ZL, the focus lens group FL, and the iris I with the positions of the eccentricity correction lens group 12 and the tilt correction lens group 14 and stored in the EEPROM 28 in advance (step S105).

Next, the CPU 20 obtains the position of the camera-shake correction lens group 111 based on the obtained positions of the eccentricity correction lens group 12 and the tilt correction lens group 14 by referring to the data table which is created by associating the positions of the eccentricity correction lens group 12 and the tilt correction lens group 14 with the position of the camera-shake correction lens group 111 and stored in the EEPROM 28 in advance (step S106).

The CPU 20 drives and controls the eccentricity correction lens group 12 and the tilt correction lens group 14 in accordance with the obtained positions of the eccentricity correction lens group 12 and the tilt correction lens group 14 (step S107) and drives and controls the camera-shake correction lens group 111 in accordance with the obtained position of the camera-shake correction lens group 111 (step S108).

In the meantime, a procedure of performing steps S105, S106, S107, and S108 is limited to the above-described procedure. Therefore, the procedure may be performed such that the CPU 20 may obtain the positions of the eccentricity correction lens group 12 and the tilt correction lens group 14 (step S105) to drive and control the eccentricity correction lens group 12 and the tilt correction lens group 14 based on the obtained positions of the eccentricity correction lens group 12 and the tilt correction lens group 14 (step S107), and then obtain the position of the camera-shake correction lens group 111 in step S106 to drive and control the camera-shake correction lens group 111 in accordance with the obtained position of the camera-shake correction lens group 111 (step S108).

In accordance with the above procedure, an optical performance of the optical system is adjusted in accordance with a photographing condition by moving the eccentricity correction lens group 12 and the tilt correction lens group 14 and the displacement of the center of the image due to the movement of the eccentricity correction lens group 12 and the tilt correction lens group 14 is corrected by moving the camera-shake correction lens group 111.

The camera-shake correction by the camera-shake correction lens group 111 is performed by appropriately moving the camera-shake correction lens group 111 based on camera-shake which is detected by the sensor which detects the camera-shake with respect to the position of the camera-shake correction lens group 111 determined by the above-described procedure of correcting the displacement of the center of the image.

Figure 26:
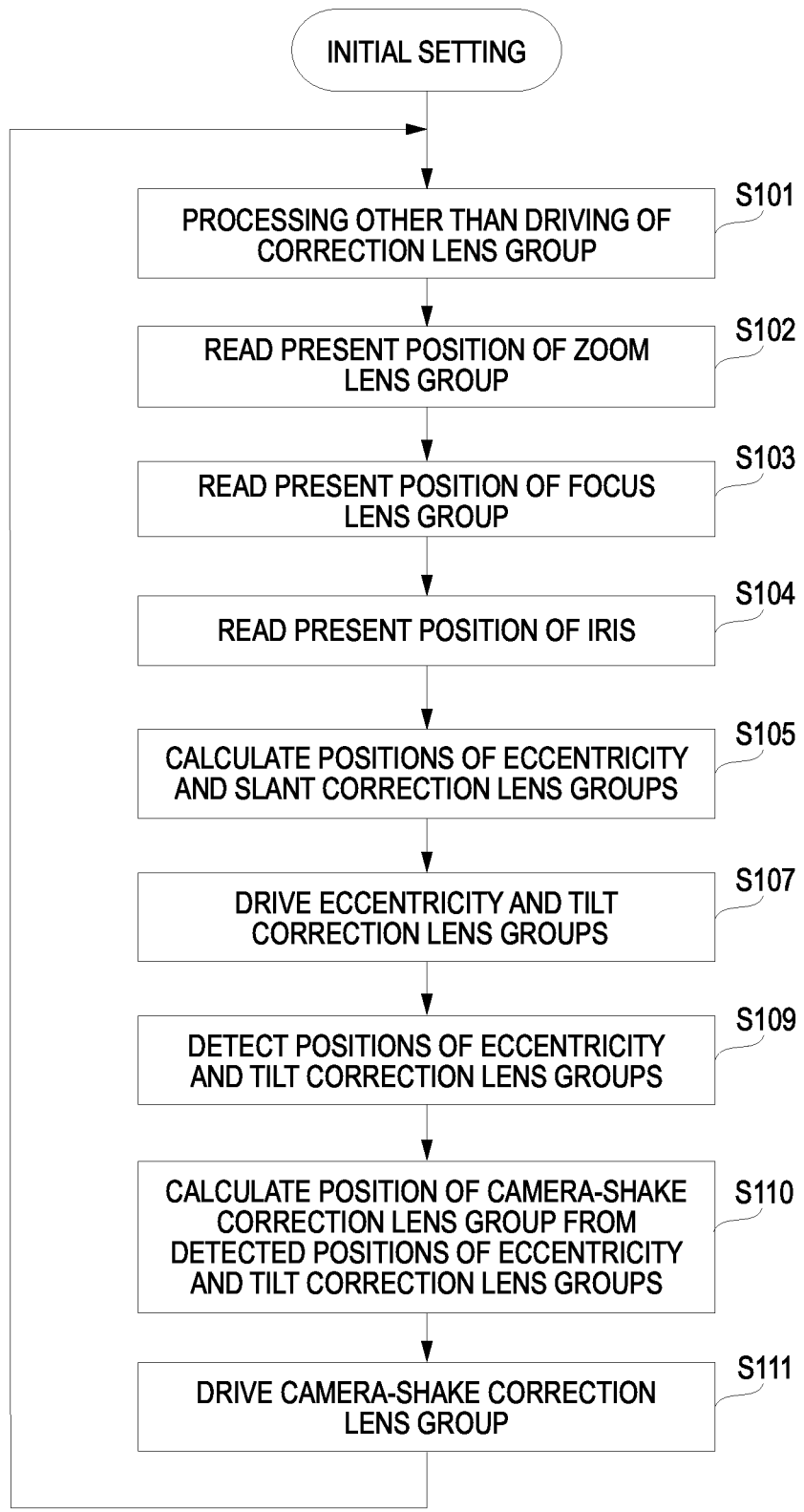
FIG. 26 is a flowchart illustrating another example of a control process which corrects displacement of a center of an image by moving a second correction lens group of the lens apparatus of FIG. 22.

FIG. 26 is a flowchart illustrating another example of a procedure of correcting displacement of a center of an image by driving the camera-shake correction lens group 111.

In the example illustrated in FIG. 25, when the position of the camera-shake correction lens group 111 is obtained by referring to the data table created by associating the positions of the eccentricity correction lens group 12 and the tilt correction lens group 14 with the position of the camera-shake correction lens group 111, the positions of the eccentricity correction lens group 12 and the tilt correction lens group 14 which are obtained based on the positions of the focus lens group FL, the zoom lens group ZL, and the iris I are used. In contrast, in the example illustrated in FIG. 26, the positions of the eccentricity correction lens group 12 and the tilt correction lens group 14 which are detected by the potentiometers HP, VP, and 14P are used.

Next, the CPU 20 drives and controls the eccentricity correction lens group 12 and the tilt correction lens group 14 based on the detected positions of the focus lens group FL, the zoom lens group ZL, and the iris I by referring to the data table which is created by associating the positions of the eccentricity correction lens group 12 and the tilt correction lens group 14 with the position of the camera-shake correction lens group 111 and stored in the EEPROM 28 in advance (step S107).

After completely moving the eccentricity correction lens group 12 and the tilt correction lens group 14, the CPU 20 reads output values of the potentiometers HP and VP to detect the position of the eccentricity correction lens group 12 at a present moment and reads an output value of the potentiometer 14P to detect the position of the tilt correction lens group 14 at a present moment (step S109).

Next, the CPU 20 obtains the position of the camera-shake correction lens group 111 based on the detected positions of the eccentricity correction lens group 12 and the tilt correction lens group 14 by referring to the data table which is created by associating the positions of the eccentricity correction lens group 12 and the tilt correction lens group 14 with the position of the camera-shake correction lens group 111 and stored in the EEPROM 28 in advance (step S110) and drives and controls the camera-shake correction lens group 111 in accordance with the obtained position of the camera-shake correction lens group 111 (step S111).

As described above, when the position of the camera-shake correction lens group 111 is obtained by referring to the data table created by associating the positions of the eccentricity correction lens group 12 and the tilt correction lens group 14 with the position of the camera-shake correction lens group 111, actual positions of the eccentricity correction lens group 12 and the tilt correction lens group 14 are detected and information on the detected positions of the lens groups 12 and 14 are used so that a control error during the driving and controlling of the lens groups 12 and 14 is eliminated to more accurately correct the displacement of the center of the image.

In the above example, the displacement of the center of the image due to the movement of the eccentricity correction lens group 12 and the tilt correction lens group 14 is corrected using the camera-shake correction lens group 111. However, separately from the camera-shake correction lens group 111, a lens group which is provided to be movable in a plane perpendicular to the optical axis may be used to correct the displacement.

Further, it has been described that any of the data table created by associating the positions of the zoom lens group ZL, the focus lens group FL, and the iris I with the positions of the eccentricity correction lens group 12 and the tilt correction lens group 14 and the data table created by associating the positions of the eccentricity correction lens group 12 and the tilt correction lens group 14 with the position of the camera-shake correction lens group 111 is stored in the EEPROM 28 of the lens apparatus 110 and the CPU 20 of the lens apparatus 110 obtains the positions of the eccentricity correction lens group 12 and the tilt correction lens group 14 and the camera-shake correction lens group 111 by referring to the data tables to control the driving of the lens groups. However, the camera main body 40 may store the data tables and drive and control the lens groups.

Figure 27:
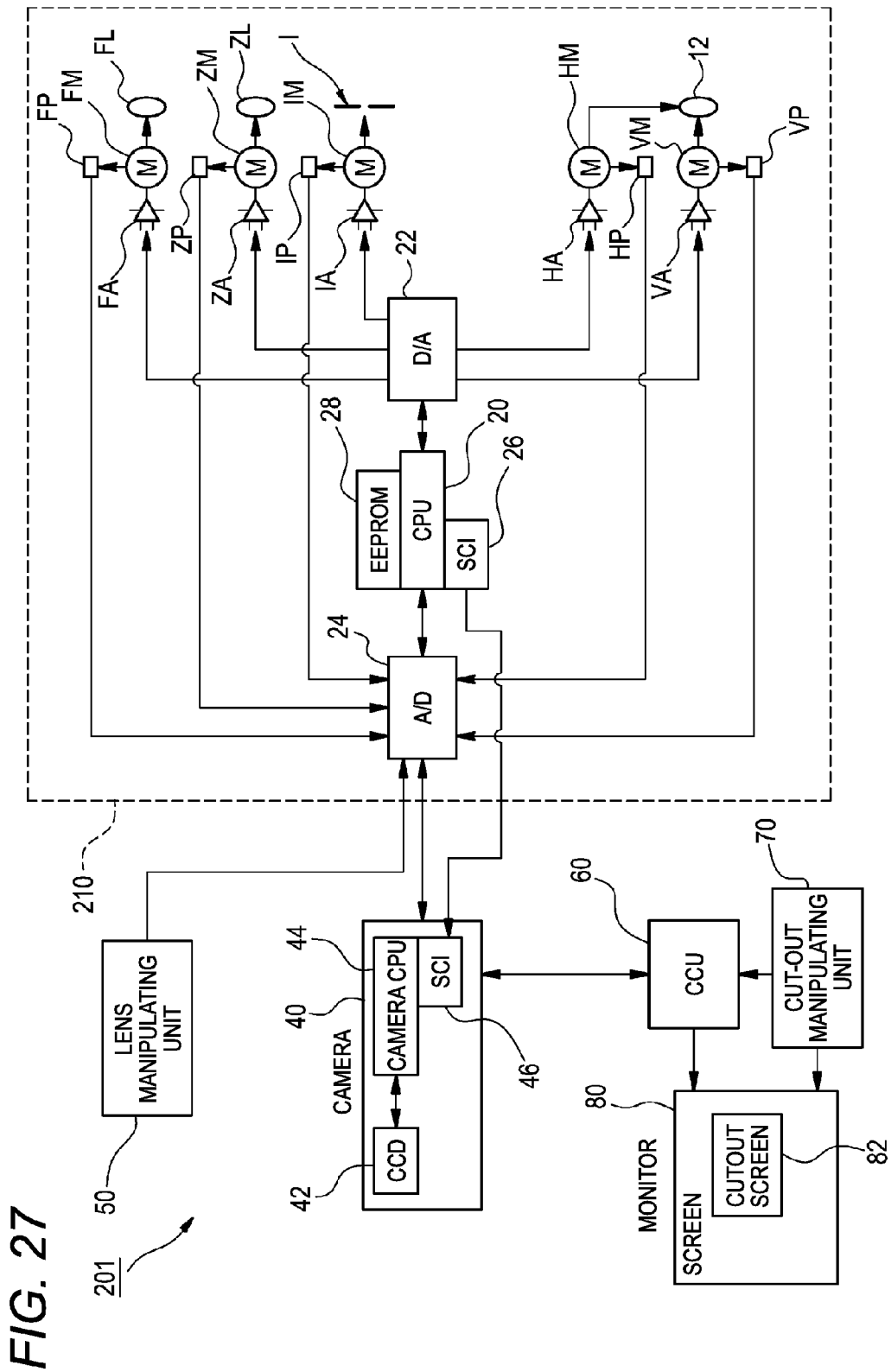
FIG. 27 is a block diagram illustrating a main configuration of another example of a camera system according to an embodiment of the present invention.
Figure 28:
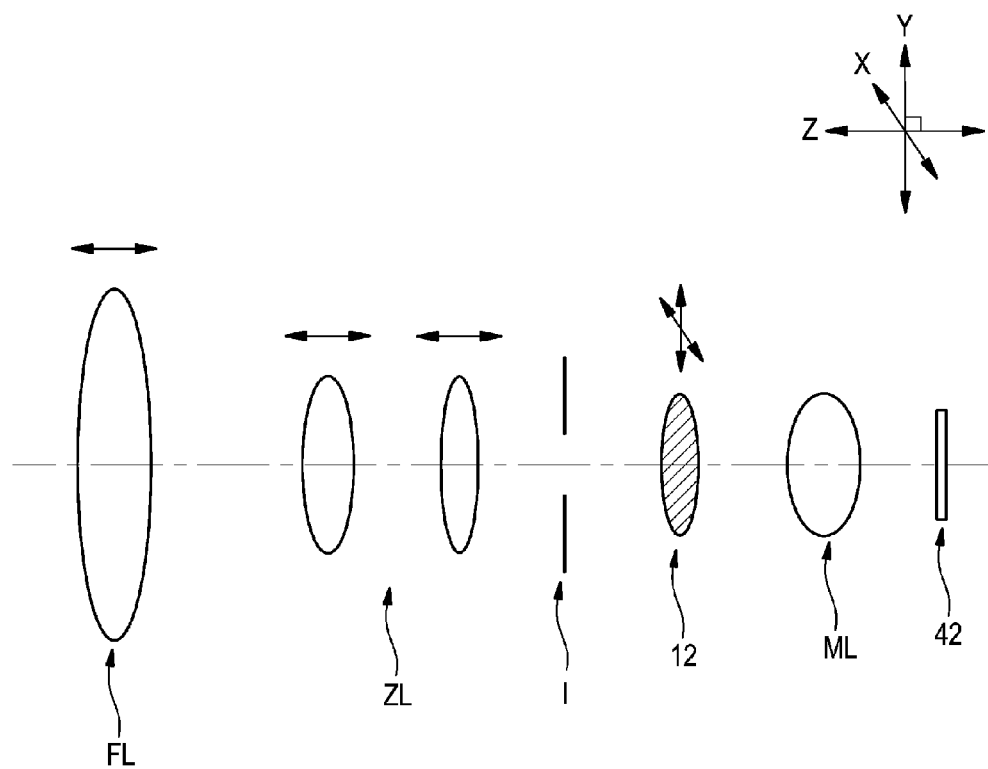
FIG. 28 is a diagram schematically illustrating an optical system of the camera system of FIG. 27.

FIG. 27 is a block diagram illustrating a main configuration of another example of a camera system according to an embodiment of the present invention and FIG. 28 is a diagram schematically illustrating an optical system of the camera system of FIG. 27. In the meantime, components which are common to the camera system 1 illustrated in FIG. 11 are denoted by common reference numerals and description thereof will be omitted.

In a lens apparatus 210 of a camera system 201 illustrated in FIG. 27, a correction lens group is configured by an eccentricity correction lens group 12 which moves in a plane (a plane parallel to an X-Y plane of FIG. 28) perpendicular to an optical axis but the tilt correction lens group 14 which forms the correction lens group together with the eccentricity correction lens group 12 in the lens apparatus 10 of the camera system illustrated in FIG. 11 is omitted.

In this camera system 201, in a relation with a photographing condition such as a position of a movable lens group or an iris, an alignment mode which drives and controls the eccentricity correction lens group 12 to adjust an image quality and a non-alignment mode which retains the eccentricity correction lens group 12 in a predetermined position regardless of the image capturing condition are provided and a lens manipulating unit 50 or a camera main body 40 may select the alignment mode or the non-alignment mode.

In an EEPROM 28 of the lens apparatus 210, a data table (for example, see FIGS. 13A and 13B) created by associating the photographing condition with position information of the eccentricity correction lens group 12 is stored in advance. Further, in the EEPROM 28, initial position information of the eccentricity correction lens group 12 when an optical performance is adjusted so as to uniformize image qualities in individual areas of the CCD 42 at the time of assembling the lens apparatus 210 is stored.

When the alignment mode is selected, the CPU 20 drives and controls motors HM and VM which move the eccentricity correction lens group 12 based on the data table stored in the EEPROM 28. When the non-alignment mode is selected, the CPU 20 drives and controls motors HM and VM which move the eccentricity correction lens group 12 based on the initial position information stored in the EEPROM 28.

A retaining unit which retains the eccentricity correction lens group 12 is provided in the lens apparatus 210. The retaining unit is mechanically engaged with a lens frame 12a which supports the eccentricity correction lens group 12 to maintain the eccentricity correction lens group 12 which is moved by the motors HM and VM in position under the control and driving by the CPU 20.

Figure 29:
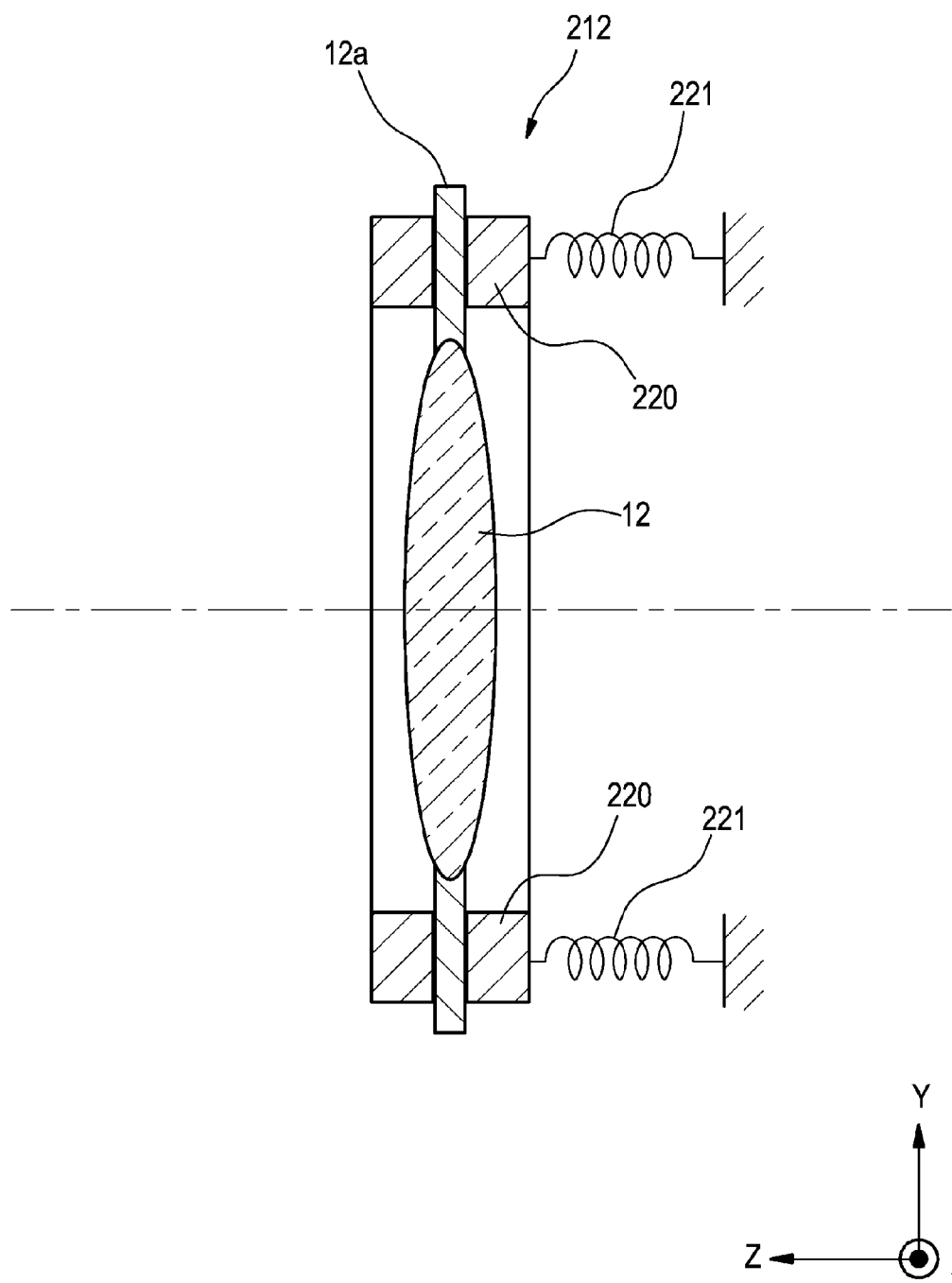
FIG. 29 is a diagram schematically illustrating a configuration of an example of a retaining unit which retains a correction lens group of the optical system of FIG. 28.

FIG. 29 illustrates a configuration of an example of a retaining unit. The retaining unit 212 illustrated in FIG. 29 includes a friction member 220 and the friction member 220 is urged in the optical axis direction by a spring 221 to be in contact with the lens frame 12a so as to retain the eccentricity correction lens group 12 in position by continuously applying an frictional force in the movement direction (an X direction and a Y direction) of the eccentricity correction lens group 12 to the lens frame 12a. Motors HM and VM move the eccentricity correction lens group 12 against the frictional force.

Figure 30:
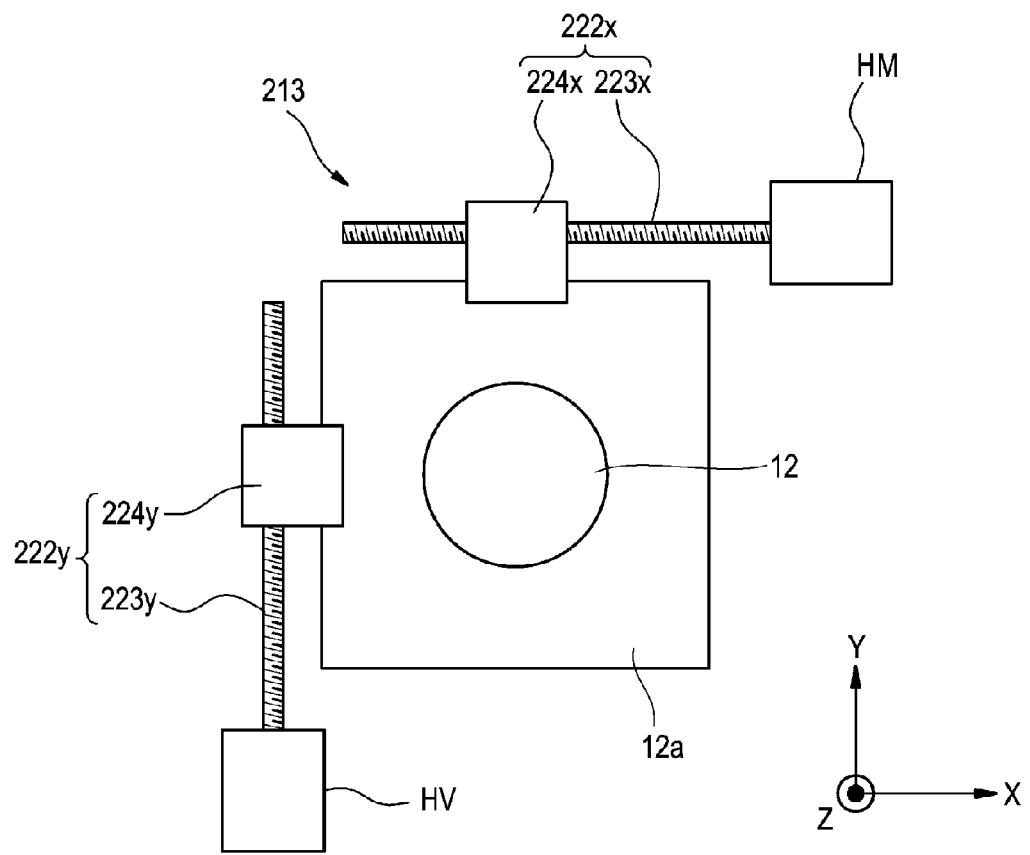
FIG. 30 is a diagram schematically illustrating a configuration of another example of a retaining unit.

FIG. 30 illustrates a configuration of another example of a retaining unit.

A retaining unit 213 illustrated in FIG. 30 includes guide mechanisms 222 which are formed by a feed screw 223 and a nut 224 in the X direction and the Y direction, respectively and a nut 224x of the guide mechanism 222x in the X direction regulates the lens frame 12a only in the X direction and a nut 224y of the guide mechanism 222y in the Y direction regulates the lens frame 12a only in the Y direction.

Figure 31:
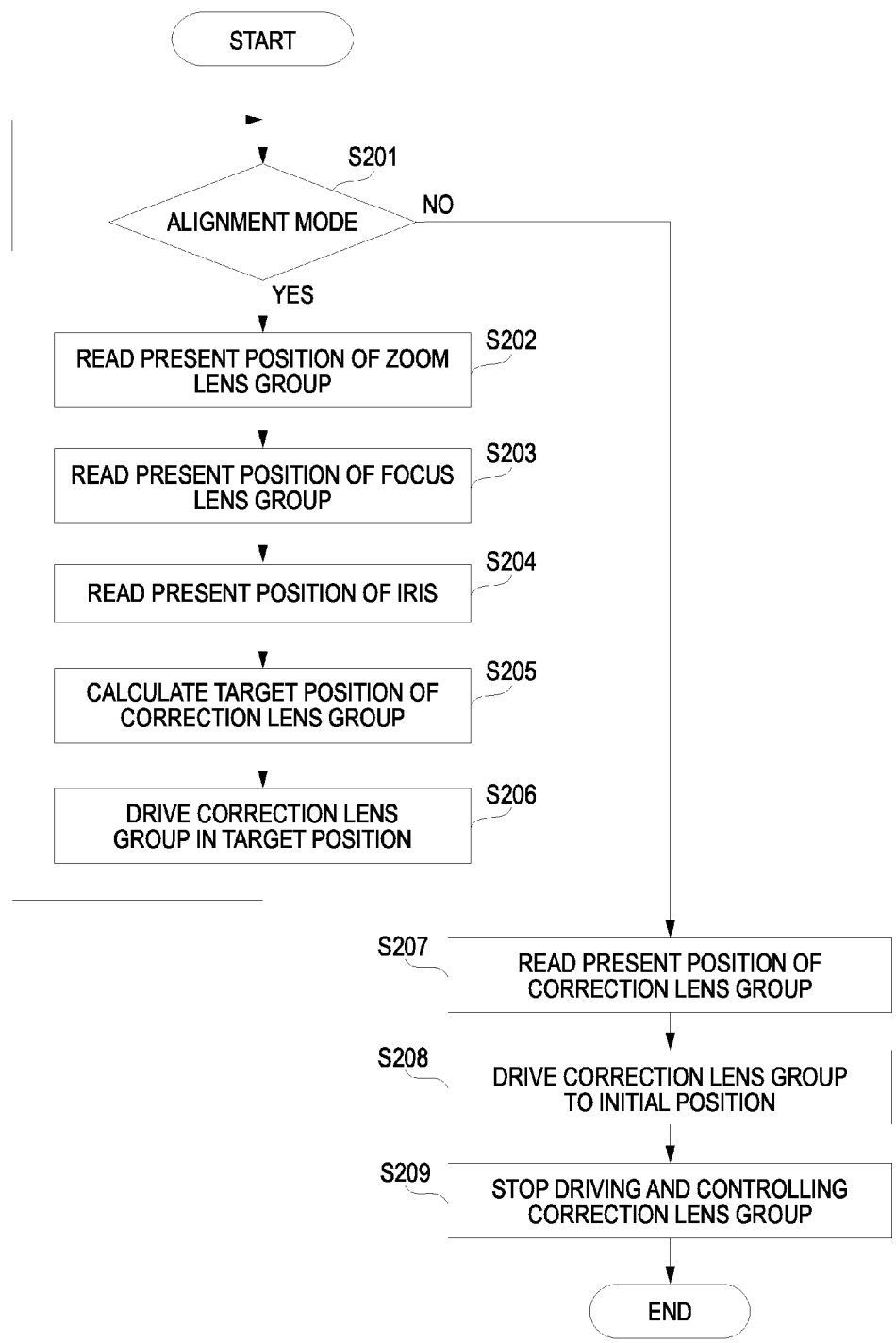
FIG. 31 is a flowchart illustrating a control process of moving the correction lens group of the optical system of FIG. 28.

FIG. 31 is a flowchart illustrating a control process of moving the eccentricity correction lens group 12.

The CPU 20 determines which mode of the alignment mode and the non-alignment mode is selected (step S201).

When the alignment mode is selected, the CPU 20 reads an output value of the potentiometer ZP to detect the position of the zoom lens group ZL at a present moment (step S202), reads an output value of the potentiometer FP to detect the position of the focus lens group FL at a present moment (step S203), and reads an output value of the potentiometer IP to detect the iris position of the iris I at a present moment (step S204).

Next, the CPU 20 obtains a target position of the eccentricity correction lens group 12 based on the detected positions of the focus lens group FL, the zoom lens group ZL, and the iris I by referring to the data table (for example, see FIGS. 13A and 13B) which is created by associating the positions of the zoom lens group ZL, the focus lens group FL, and the iris I with the eccentricity correction lens group 12 and stored in the EEPROM 28 in advance (step S205).

The CPU 20 drives and controls the motors HM and VM which move the eccentricity correction lens group 12 in accordance with the obtained target position of the eccentricity correction lens group 12 (step S206).

When the non-alignment mode is selected, the CPU 20 reads output values of the potentiometers HP and VP to detect the position of the eccentricity correction lens group 12 at a present moment (step S207).

Next, the CPU 20 drives and controls the motors HM and VM which move the eccentricity correction lens group 12 in accordance with the detected position of the eccentricity correction lens group 12 by referring to the initial position information of the eccentricity correction lens group 12 stored in the EEPROM 28 in advance to move the eccentricity correction lens group 12 in the initial position (step S208).

After moving the eccentricity correction lens group 12 in the initial position, the CPU 20 stops driving and controlling the motors HM and VM which move the eccentricity correction lens group 12 (stops supplying a power to the motors HM and VM, the amplifiers HA and VA, and the potentiometers HP and VP) (step S209). The eccentricity correction lens group 12 is mechanically locked by the retaining units 212 and 213 to be retained in position.

As described above, according to the lens apparatus 210 of the camera system 210, the eccentricity correction lens group 12 is moved to adjust an optical performance of the optical system so that a high quality image may be captured regardless of the secular change and the change of the photographing condition. Further, the retaining unit 212 which retains the eccentricity correction lens group 12 in position is mechanically engaged with the lens frame 21a which supports the eccentricity correction lens group 12 to retain the eccentricity correction lens group 12 in that position so that no power is consumed to retain the eccentricity correction lens group 12 in that position, which may reduce power consumption in the lens apparatus 210.

In the meantime, in the above-described process, the photographing condition (the positions of the focus lens group FL, the zoom lens group ZL, and the iris I) varies sometimes from moment to moment. Therefore, in the alignment mode, the CPU 20 continuously drives and controls the motors HM and VM (the power is continuously supplied to the motors HM and VM, the amplifiers HA and VA, and the potentiometers HP and VP). However, the CPU 20 may be configured to monitor the change of the output values of the potentiometers ZP, FP, and IP to drive and control the motors HM and VM only when the change occurs and stop driving and controlling the motors HM and VM while no change occurs. By doing this, the power consumption in the lens apparatus 210 may be further reduced.

Figure 32:
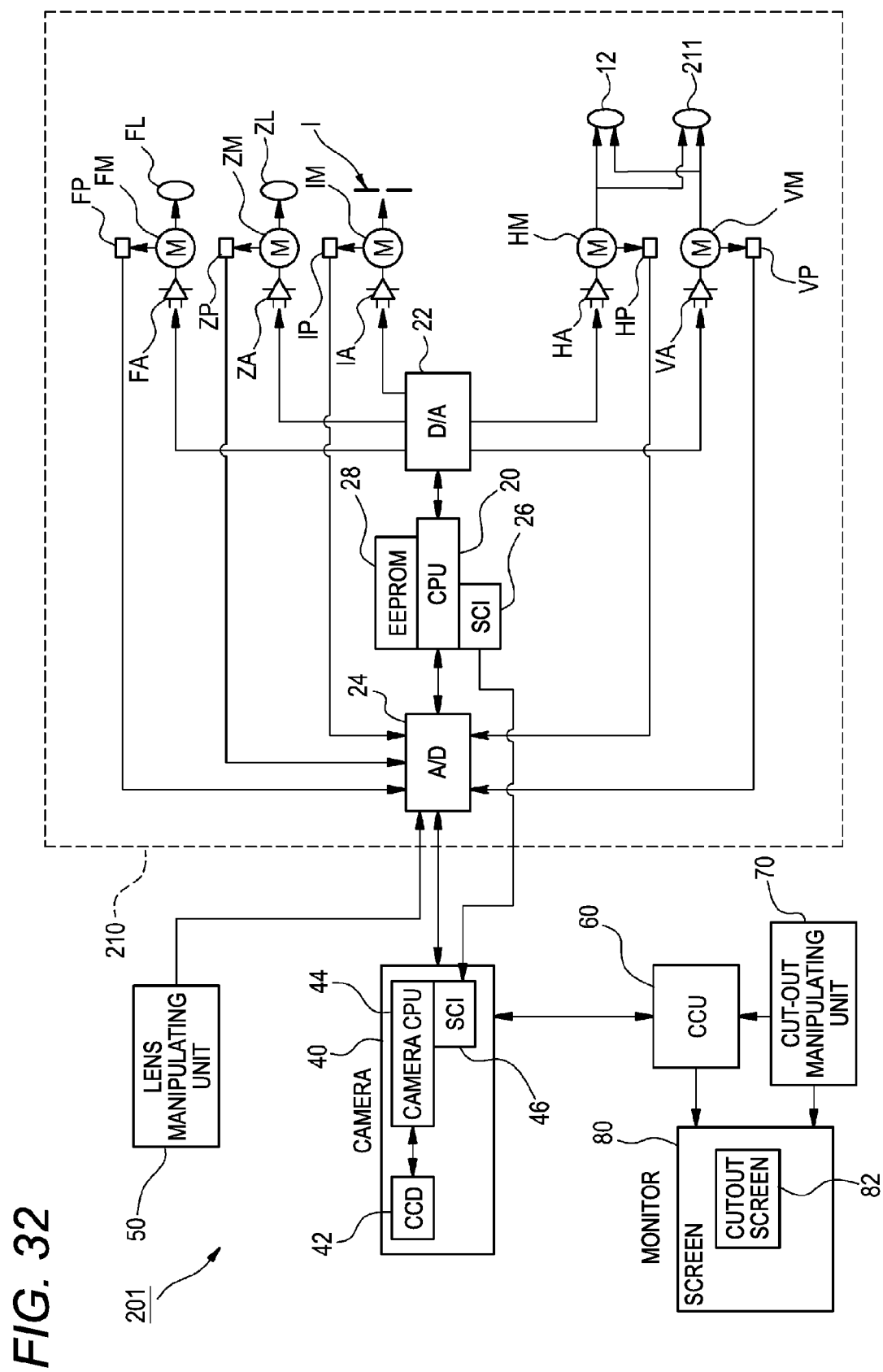
FIG. 32 is a block diagram illustrating a main configuration of another example of a camera system according to an embodiment of the present invention.
Figure 33:
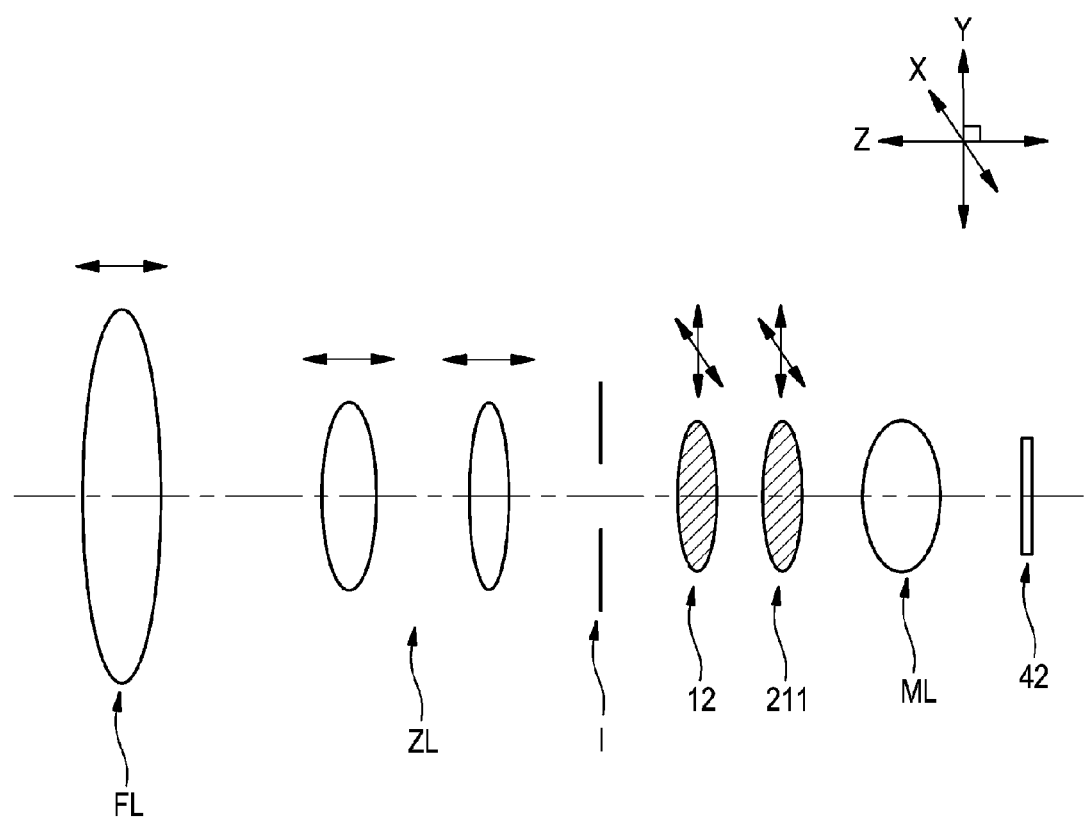
FIG. 33 is a diagram schematically illustrating an optical system of the camera system of FIG. 32.

FIG. 32 illustrates a main configuration of a modification example of a camera system 201 and FIG. 33 schematically illustrates an optical system of the camera system of FIG. 32.

In the camera system 201 illustrated in FIG. 32, a camera-shake correction lens group 11 is provided in an optical system of a lens apparatus 210 and a sensor (not illustrated) which detects the camera-shake is provided in the lens apparatus 210.

The camera-shake correction lens group 211 is provided so as to be movable in a plane (a plane parallel to an X-Y plane of FIG. 33) perpendicular to an optical axis of the optical system.

The CPU 20 obtains camera-shake information detected by the sensor which detects the camera-shake and controls a driving unit which moves the camera-shake correction lens group 211 so as to correct image blurring due to the camera-shake.

Here, the eccentricity correction lens group 12 may be retained in a fixed position by a retaining unit 212 and thus driving units (motors HM and VM and amplifiers HA and VA which input driving signals to the motors HM and VM) which move the eccentricity correction lens group 12 may be driven when the eccentricity correction lens group 12 moves in the initial position in the non-alignment mode and the photographing condition (positions of the focus lens group FL, the zoom lens group ZL, and the iris I) is changed also in the alignment mode.

Therefore, in the camera system 201 according to this embodiment, the driving unit which moves the camera-shake correction lens group 211 is configured by motors HM and VM which move the eccentricity correction lens group 12 which is provided to be movable in a plane perpendicular to an optical axis of the optical system and amplifiers HA and VA which input driving signals to the motors HM and VM, which is similar to the camera-shake correction lens group 211 and the driving unit is commonly used for the eccentricity correction lens group 12 and the camera-shake correction lens group 211.

When the driving unit is commonly used for the eccentricity correction lens group 12 and the camera-shake correction lens group 211, a target to be driven by the driving unit is switched between the eccentricity correction lens group 12 and the camera-shake correction lens group 211. For example, when a moving coil type voice coil motor is used as the motors HM and VM, the coils are provided in the eccentricity correction lens group 12 and the camera-shake correction lens group 211 which is moving, respectively to share a magnet so that the driving unit may be shared by the eccentricity correction lens group 12 and the camera-shake correction lens group 211 and the electricity is selectively supplied to the coils so that a target to be driven by the driving unit may be switched between the eccentricity correction lens group 12 and the camera-shake correction lens group 211.

Further, when the driving unit is shared by the eccentricity correction lens group 12 and the camera-shake correction lens group 211, if the eccentricity correction lens group 12 is driven by the driving unit and the camera-shake correction lens group 211 is released from the driving unit, it is required to retain the camera-shake correction lens group 211 in a fixed position. Therefore, a retaining unit therefore is provided. The retaining unit may be configured, for example, to use a plurality of springs to return the camera-shake correction lens group 211 in a center position (a position where an optical axis of the camera-shake correction lens group matches an optical axis of the optical system) to retain the camera-shake correction lens group 211 in the center position by the springs.

Further, in the camera system 201 according to the embodiment, an alignment mode which drives and controls only the eccentricity correction lens group 12 and a camera-shake correction mode which drives and controls at least the camera-shake correction lens group 211 are provided. Further, in the camera-shake correction mode, a first mode which drives and controls only the camera-shake correction lens group 211 and a second mode which repeatedly performs a cycle of driving the eccentricity correction lens group 12 and driving the camera-shake correction lens group 211 as one cycle are provided and a lens manipulating unit 50 or a camera main body 40 may select the alignment mode, the first mode, and the second mode. For example, the alignment mode is selected when a tripod stand is used so that no camera-shake correction is required.

Figure 34:
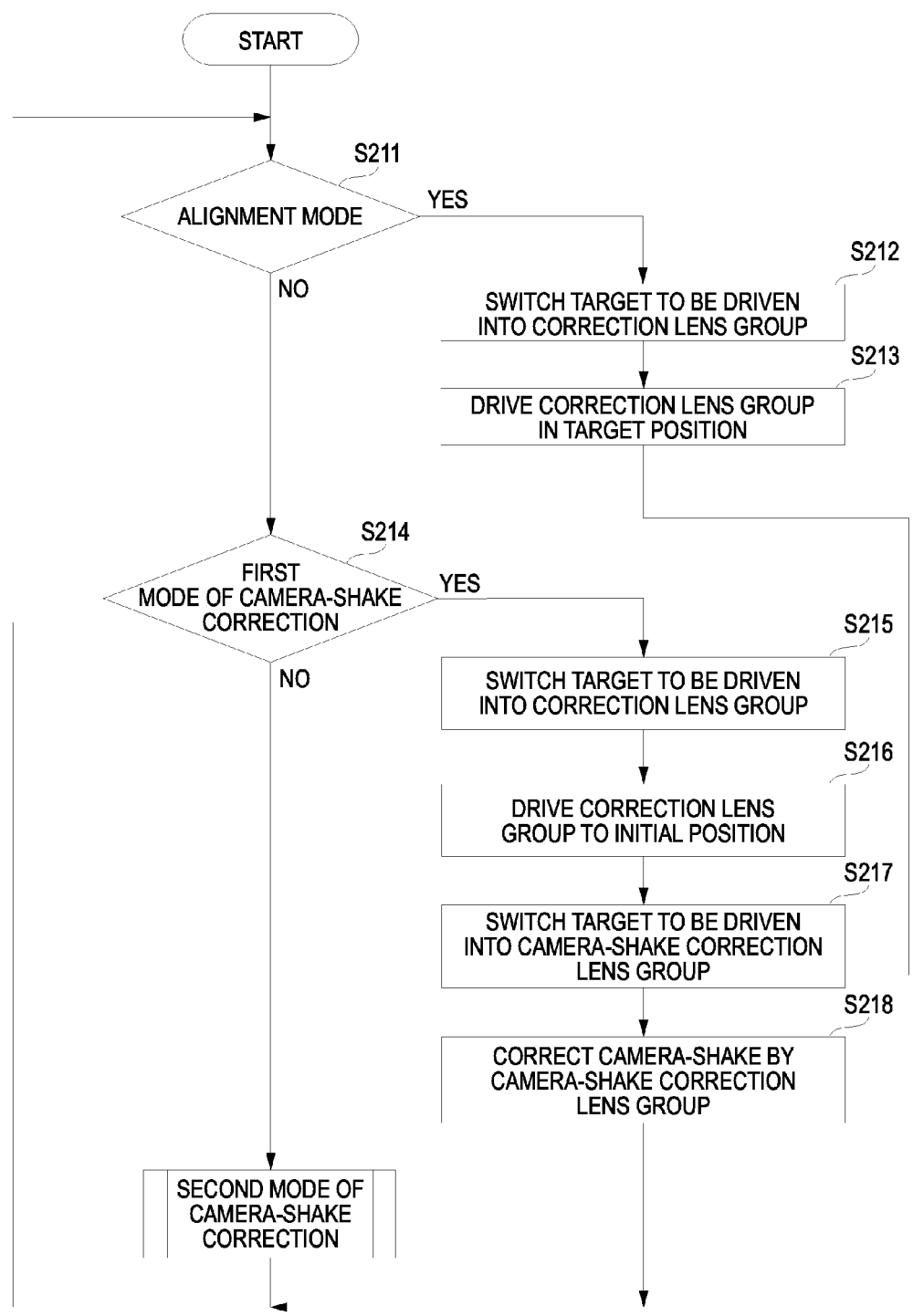
FIG. 34 is a flowchart illustrating a control process of moving a correction lens group.
Figure 35:
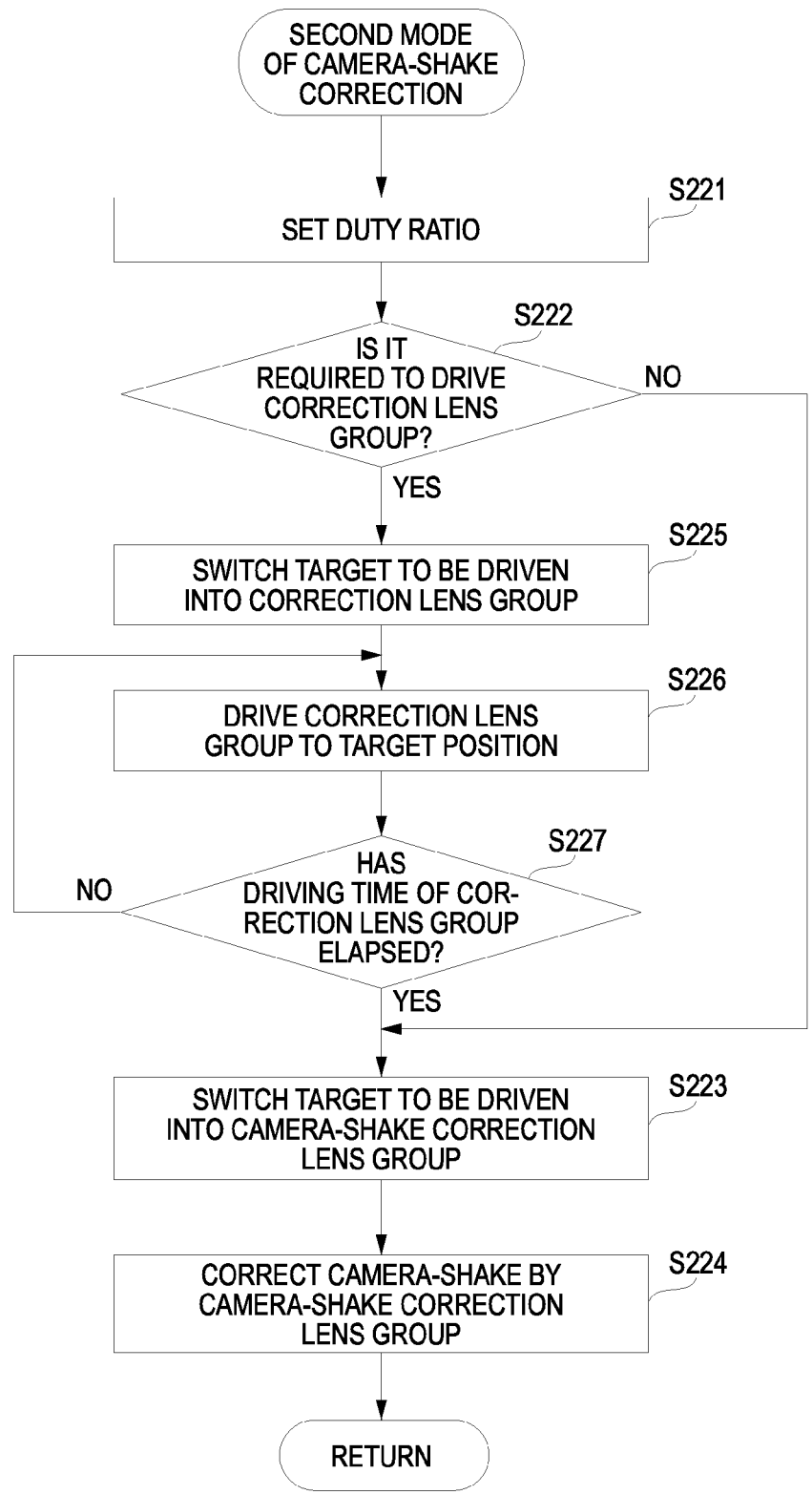
FIG. 35 is a flowchart illustrating a control process of moving a correction lens group.

FIGS. 34 and 35 are flowcharts illustrating a control process of moving the eccentricity correction lens group 12.

First, the CPU 20 determines whether the selected mode is an alignment mode (step S211).

When the alignment mode is selected, the CPU 20 switches a target to be driven by the driving unit into the eccentricity correction lens group 12 (step S212).

The CPU 20 performs steps S202 to S206 illustrated in FIG. 31 to drive and control the eccentricity correction lens group 12 in a target position in a relation with the photographing condition (step S213). In the meantime, while no change in the photographing condition occurs, as described above, the CPU 20 may be configured to stop driving and controlling the eccentricity correction lens group 12.

When the alignment mode is not selected, next, the CPU 20 determines whether the selected mode is the first mode (a mode which corrects the camera-shake by driving only the camera-shake correction lens group 211) (step S214).

When the first mode is selected, the CPU 20 switches the target to be driven by the driving unit into the eccentricity correction lens group 12 (step S215) to perform steps S207 and S208 illustrated in FIG. 31 and moves the eccentricity correction lens group 12 in an initial position (step S216).

Next, the CPU 20 switches and fixes the target to be driven by the driving unit into the camera-shake correction lens group 211 after moving the eccentricity correction lens group 12 in the initial position (step S217).

The CPU 20 obtains camera-shake information detected by the sensor which detects the camera-shake and drives and controls the camera-shake correction lens group 211 so as to correct image blurring due to the camera-shake (step S218).

When the first mode is not selected, that is, when the second mode (a mode which repeatedly performs a cycle of driving the eccentricity correction lens group 12 and driving the camera-shake correction lens group 211 as one cycle) is selected, the CPU 20 sets a time ratio (a duty ratio) at which the eccentricity correction lens group 12 is driven per one cycle (step S221). A method of setting a duty ratio will be described below.

Next, the CPU 20 determines whether it is required to drive and control the eccentricity correction lens group 12 in a relation with the photographing condition (step S222).

If it is determined that it is not required to drive and control the eccentricity correction lens group 12 in a relation with the photographing condition, that is, the photographing condition is not changed, the CPU 20 switches the target to be driven by the driving unit into the camera-shake correction lens group 211 (step S223).

The CPU 20 obtains the camera-shake information detected by the sensor which detects the camera-shake to drive and control the camera-shake correction lens group 211 so as to correct image blurring due to the camera-shake until a time when the camera-shake correction lens group 211 is driven per one cycle determined by the duty ratio has elapsed (step S224).

If it is determined that it is required to drive and control the eccentricity correction lens group 12 in a relation with the photographing condition, that is, the image capturing condition is changed, the CPU 20 switches the target to be driven by the driving unit into the eccentricity correction lens group 12 (step S225).

Next, The CPU 20 performs steps S202 to S206 illustrated in FIG. 31 to drive and control the eccentricity correction lens group 12 in a target position in a relation with the photographing condition (step S226).

Next, the CPU 20 stands by until the time when the eccentricity correction lens group 12 is driven per one cycle determined by the duty ratio has elapsed (step S227) and switches the target to be driven by the driving unit into the camera-shake correction lens group 211 after the time has elapsed (step S223).

The CPU 20 obtains the camera-shake information detected by the sensor which detects the camera-shake to drive and control the camera-shake correction lens group 211 so as to correct image blurring due to the camera-shake until a time when the camera-shake correction lens group 211 is driven per one cycle determined by the duty ratio has elapsed (step S224).

In the meantime, instead of waiting until the time when the eccentricity correction lens group 12 is driven per one cycle has elapsed in step S227, after the eccentricity correction lens group 12 reaches the target position, the target to be driven by the driving unit may be switched into the camera-shake correction lens group 211.

Figure 36:
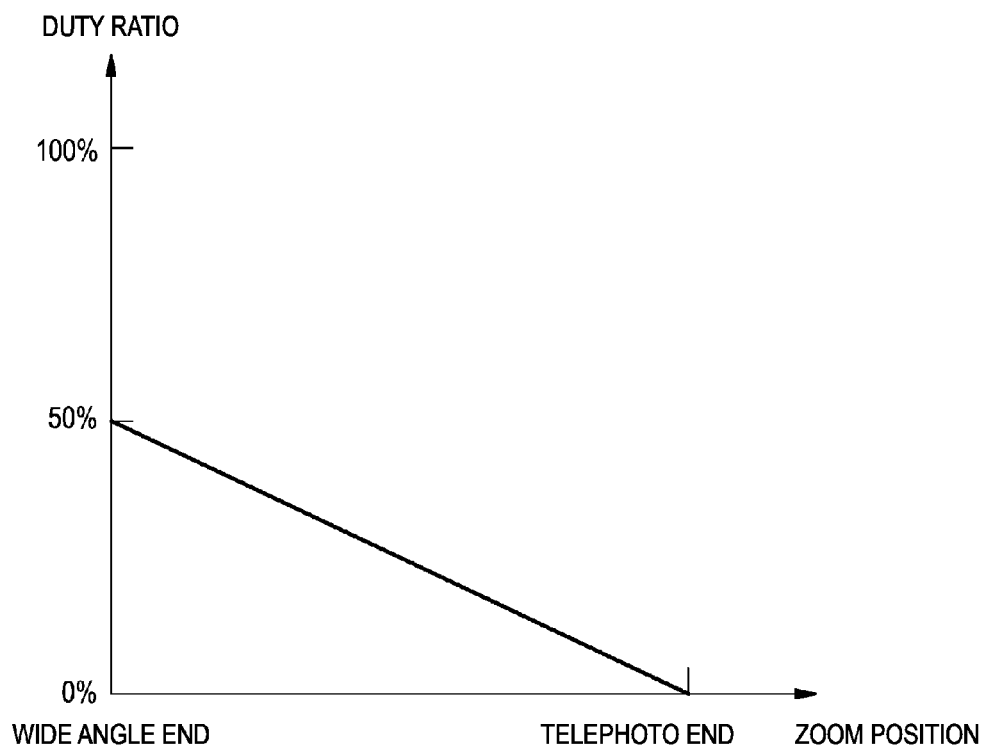
FIG. 36 is a diagram illustrating a method of setting a duty ratio in the control process of FIG. 35.

FIG. 36 is a diagram illustrating an example of the method of setting a duty ratio.

The duty ratio (a time ratio at which the eccentricity correction lens group 12 is driven per one cycle) may be fixed, for example, at 50% regardless of the image capturing condition but the duty ratio varies depending on the photographing condition in the camera system 201 according to this embodiment.

FIG. 36 illustrates an example of setting the duty ratio in a relation with the position of the zoom lens group ZL. Generally, the influence of the camera-shake is increased as a zoom position is directed from a wide angle end to a telephoto end so that a duty ratio is set to be 50% at the wide angle end and 0% at the telephoto end to appropriately interpolate between the ends in the example illustrated in FIG. 36. In the meantime, in the example, illustrated in the drawing, interpolation by a straight line is adopted but interpolation by a curve may be adopted.

Further, the duty ratio may be set in the relation with the position of the focus lens group FL. Generally, the influence of the camera-shake is increased as a focus position is directed from a near end to an infinite end so that a duty ratio is set to be, for example, 50% at the near end and 0% at the infinite end to appropriately interpolate between the ends.

Further, the duty ratio may be set in the relation with the position of the iris I. Generally, the influence of the camera-shake is increased as an iris position is directed from an open iris to a minimum iris so that a duty ratio is set to be, for example, 50% in the open iris and 0% in the minimum iris to appropriately interpolate between the irises.

A data table created by associating the position of the zoom lens group ZL, the position of the focus lens group FL, or the position of the iris I with the duty ratio is stored in the EEPROM 28 of the lens apparatus 210 in advance and the CPU 20 sets the duty ratio based on the detected position of the zoom lens group ZL, the focus lens group FL, or the iris I by referring to the data table stored in the EEPROM 28.

As described above, the driving unit is shared by the eccentricity correction lens group 12 and the camera-shake correction lens group 211 so that a size and a weight of the lens apparatus 210 may be reduced and the power consumption in the lens apparatus 210 may be further reduced.

In the meantime, it has been described that the lens manipulating unit 50 or the camera main body 40 selects the alignment mode which drives and controls only the eccentricity correction lens group 12 and the camera-shake correction mode which drives and controls at least the camera-shake correction lens group 211 (the first mode or the second mode). However, for example, the lens manipulating unit 50 or the camera main body 40 may set any one from the first mode and the second mode in which the camera-shake is corrected in advance and then the CPU 20 may switch the alignment mode and the camera-shake correction mode in accordance with the detection result of the sensor which detects the camera-shake.

The present description discloses the following matters.

(1) It is a lens apparatus including: an optical system which includes a movable lens group, the optical system including a first correction lens group which adjusts an optical performance of the optical system by changing a position with respect to an optical axis and a second correction lens group which adjusts a center position of an image which is formed by the optical system by changing the position with respect to the optical axis in a plane perpendicular to the optical axis; and a control unit which controls driving of the first correction lens group so as to correct the change of the optical performance due to movement of the movable lens group based on position information of the movable lens group and controls driving of the second correction lens group so as to correct displacement of the center of an image due to the movement of the movable lens group and the first correction lens group based on position information of the first correction lens group.

(2) It is the lens apparatus of (1), in which the second correction lens group is a camera-shake correction lens group.

(3) It is the lens apparatus of (1) or (2), further including: a storing unit which stores a first table created by associating a position of the movable lens group with a position of the first correction lens group and a second table created by associating the position of the first correction lens group with a position of the second correction lens group, in which the control unit controls the driving of the first correction lens group based on position information of the movable lens group by referring to the first table and controls the driving of the second correction lens group based on position information of the first correction lens group by referring to the second table.

(4) It is the lens apparatus of (3), in which when the control unit controls the driving of the second correction lens group based on the position information of the first correction lens group by referring to the second table, the control unit uses the position information of the first correction lens group which is calculated based on position information of the movable lens group by referring to the first table.

(5) It is the lens apparatus of (3), further including: a detecting unit which detects the position of the first correction lens group, in which when the control unit controls the driving of the second correction lens group based on the position information of the first correction lens group by referring to the second table, the control unit uses the position information of the first correction lens group which is detected by the detecting unit.

(6) It is the lens apparatus of any one of (1) to (5), further including: a retaining unit which is mechanically engaged with a lens frame which supports the first correction lens group to retain the moved first correction lens group in position.

(7) It is the lens apparatus of (6), in which the retaining unit includes a friction member which is urged to the lens frame of the first correction lens group.

(8) It is the lens apparatus of (6) or (7), in which a driving unit which moves the first correction lens group and a driving unit which moves the second correction lens group are commonly used.

(9) It is the lens apparatus of (8), in which the control unit selectively switches a target to be driven by the driving unit into the first correction lens group or the second correction lens group.

(10) It is the lens apparatus of (9), in which the second correction lens group is a camera-shake correction lens group, and the control unit is configured to select an alignment mode which drives only the first correction lens group and a camera-shake correction mode which drives at least the camera-shake correction lens group.

(11) It is the lens apparatus of (10), in which the control unit is configured to select a first mode which drives only the camera-shake correction lens group and a second mode which repeats a cycle of driving the first correction lens group and driving the camera-shake correction lens group as one cycle in the camera-shake correction mode.

(12) It is the lens apparatus of (11), in which the control unit is configured such that a duty ratio of a time when the first correction lens group is driven per one cycle in the second mode is variable.

(13) It is the lens apparatus of (12), in which the control unit changes the duty ratio based on the position information of the movable lens group.

(14) It is the lens apparatus of (12) or (13), further including: an iris which adjust an amount of light, in which the control unit changes the duty ratio based on position information of the iris.

(15) It is the lens apparatus of (10), further including: a sensor which detects camera-shake, in which the control unit selectively switches the alignment mode and the camera-shake correction mode based on a camera-shake detection result by the sensor.

(16) It is an image capturing apparatus including: the lens apparatus of any one of (1) to (15).

(17) It is an image capturing apparatus including: a lens apparatus which includes an optical system including a movable lens group; and a main body of an image capturing apparatus in which the lens apparatus is mounted, in which the optical system includes a first correction lens group which adjusts an optical performance of the optical system by changing a position with respect to an optical axis; and a second correction lens group which adjusts a center position of an image which is formed by the optical system by changing the position with respect to the optical axis in a plane perpendicular to the optical axis, and the main body of the image capturing apparatus includes a control unit which controls driving of the first correction lens groups so as to correct the change of the optical performance due to movement of the movable lens group based on position information of the movable lens group and controls driving of the second correction lens group so as to correct displacement of the center of an image due to the movement of the movable lens group and the first correction lens group based on position information of the first correction lens group.

(18) It is the image capturing apparatus of (17), in which the second correction lens group is a camera-shake correction lens group.

(19) It is the image capturing apparatus of (17) or (18), in which the main body of the image capturing apparatus includes a storing unit which stores a first table created by associating a position of the movable lens group with a position of the first correction lens group and a second table created by associating the position of the first correction lens group with a position of the second correction lens group, and the control unit controls the driving of the first correction lens group based on position information of the movable lens group by referring to the first table and controls the driving of the second correction lens group based on position information of the first correction lens group by referring to the second table.

(20) It is the image capturing apparatus of (19), in which when the control unit controls the driving of the second correction lens group based on the position information of the first correction lens group by referring to the second table, the control unit uses the position information of the first correction lens group which is calculated based on position information of the movable lens group by referring to the first table.

(21) It is the image capturing apparatus of (19), further including:
a detecting unit which detects the position of the first correction lens group,
in which when the control unit controls the driving of the second correction lens group based on the position information of the first correction lens group by referring to the second table, the control unit uses the position information of the first correction lens group which is detected by the detecting unit.

(22) It is the image capturing apparatus of any one of (17) to (21), further including: a retaining unit which is mechanically engaged with a lens frame which supports the first correction lens group to retain the moved first correction lens group in position.

(23) It is the image capturing apparatus of (22), in which the retaining unit includes a friction member which is urged to the lens frame of the first correction lens group.

(24) It is the image capturing apparatus of (22) or (23), in which a driving unit which moves the first correction lens group and a driving unit which moves the second correction lens group are commonly used.

(25) It is the image capturing apparatus of (24), in which the control unit selectively switches a target to be driven by the driving unit into the first correction lens group or the second correction lens group.

(26) It is the image capturing apparatus of (25), in which the second correction lens group is a camera-shake correction lens group, and the control unit is configured to select an alignment mode which drives only the first correction lens group and a camera-shake correction mode which drives at least the camera-shake correction lens group.

(27) It is the image capturing apparatus of (26), in which the control unit is configured to select a first mode which drives only the camera-shake correction lens group and a second mode which repeats a cycle of driving the first correction lens group and driving the camera-shake correction lens group as one cycle in the camera-shake correction mode.

(28) It is the image capturing apparatus of (27), in which the control unit is configured such that a duty ratio of a time when the first correction lens group is driven per one cycle in the second mode is variable.

(29) It is the image capturing apparatus of (29), in which the control unit changes the duty ratio based on the position information of the movable lens group.

(30) It is the image capturing apparatus of (28) or (29), further including: an iris which adjust an amount of light, in which the control unit changes the duty ratio based on position information of the iris.

(31) It is the image capturing apparatus of (26), further including: a sensor which detects camera-shake, in which the control unit selectively switches the alignment mode and the camera-shake correction mode based on a camera-shake detection result by the sensor.

Industrial Applicability

According to the present invention, it is possible to provide a lens apparatus and an image capturing apparatus which may capture a high quality image regardless of the displacement of a center of an image due to the movement of the movable lens group and the first correction lens group. Further, the present invention provides a lens apparatus and an image capturing apparatus which may suppress increase of power consumption when a change of an optical characteristic of an optical system is corrected by moving the first correction lens group.

Although the present invention has been described with reference to detailed and specific embodiments thereof, it is obvious to those skilled in the art that various changes or modifications may be made without departing from the spirit and scope of the present invention.

The present application is based on Japanese Patent Application (Patent application 2011-215644) filed on 29.09.11 and Japanese Patent Application (Patent application 2011-215645) filed on 29.09.11, and the content of which is incorporated herein by reference.

REFERENCE SIGNS LIST

101: Camera system
110: Lens apparatus
111: Camera-shake correction lens group
12: Eccentricity correction lens group
14: Tilt correction lens group
20: CPU
40: Camera main body
42: CCD
44: Camera CPU
50: Lens manipulating unit
FL: Focus lens group
ZL: Zoom lens group, I: Iris

The invention claimed is:

1. A lens apparatus comprising:
   an optical system which includes a movable lens group, the optical system including a first eccentricity/tilt correction lens group which adjusts an optical characteristic of the optical system by changing a position with respect to an optical axis and second camera-shake correction lens group which adjusts a center position of an image which is formed by the optical system by changing the position with respect to the optical axis in a plane perpendicular to the optical axis; and
   at least one central processing unit configured to execute a control unit configured to control the first eccentricity/tilt correction lens group so as to correct the change of the optical characteristic due to movement of the movable lens group based on position information of the movable lens group and configured to control driving of the second camera-shake correction lens group so as to correct displacement of the center of an image due to the movement of the first eccentricity/tilt correction lens group based on position information of the first eccentricity/tilt correction lens group.

2. The lens apparatus of claim 1, wherein the optical characteristic is resolution, modulation transfer function MTF, a parameter substituting resolution or modulation transfer function MTF, a contrast evaluation value of an image, an area of a portion having high brightness in a predetermined area of an image, an area having a largest brightness value when as image is divided into a plurality of areas, a result of image analysis which is performed on a contour of a subject image of an image, and a result of image analysis which is performed on a shape of an image so that the result is closest to a predetermined analysis value.

3. The lens apparatus of claim 1, further comprising:
   at least one central processing unit configured to execute a storing unit configured to store a first table created by associating a position of the movable lens group with a position of the first eccentricity/tilt correction lens group and a second table created by associating the position of the first eccentricity/tilt correction lens group with a position of the second camera-shake correction lens group,
   wherein the at least one central processing unit which is configured to execute the control unit configured to control the driving of the first eccentricity/tilt correction lens group based on position information of the movable lens group by referring to the first table and to control the driving of the second camera-shake correction lens group based on position information of the first eccentricity/tilt correction lens group by referring to the second table.

4. The lens apparatus of claim 3, wherein when the at least one central processing unit which is configured to execute the control unit configured to control the driving of the second camera-shake correction lens group based on the position information of the first eccentricity/tilt correction lens group by referring to the second table, and the at least one central processing unit which is configured to execute the control unit configured to use the position information of the first eccentricity/tilt correction lens group which is calculated based on position information of the movable lens group by referring to the first table.

5. The lens apparatus of claim 3, further comprising:
   at least one central processing unit configured to execute a detecting unit configured to detect the position of the first eccentricity/tilt correction lens group,
   wherein when the at least one central processing unit which is configured to execute the control unit configured to control the driving of the second camera-shake correction lens group based on the position information of the first eccentricity/tilt correction lens group by referring to the second table, and the at least one central processing unit which is configured to execute the control unit configured to use the position information of the first eccentricity/tilt correction lens group which is detected by the at least one central processing unit which is configured to execute the detecting unit.

6. The lens apparatus of claim 1, further comprising:
   a retaining unit which is mechanically engaged with a lens frame which supports the first eccentricity/tilt correction lens group to retain the moved first eccentricity/tilt correction lens group in position.

7. The lens apparatus of claim 6, wherein the retaining unit includes a friction member which is urged to the lens frame of the first eccentricity/tilt correction lens group.

8. The lens apparatus of claim 6, wherein at least one central processing unit configured to execute a first driving unit configured to move the first eccentricity/tilt correction lens group and at least one central processing unit configured to execute a second driving unit configured to the second camera-shake correction lens group and are commonly used.

9. The lens apparatus of claim 8, wherein the at least one central processing unit which is configured to execute the control unit configured to selectively switch a target to be driven by the at least one central processing unit which is configured to execute the driving unit into the first eccentricity/tilt correction lens group or the second camera-shake correction lens group.

10. The lens apparatus of claim 9, wherein
the at least one central processing unit which is configured to execute the control unit configured to select an alignment mode which drives only the first eccentricity/tilt correction lens group and a camera-shake correction mode which drives at least the camera-shake correction lens group.

11. The lens apparatus of claim 10, wherein the at least one central processing unit which is configured to execute the control unit configured to select a first mode which drives only the camera-shake correction lens group and a second mode which repeats a cycle of driving the first eccentricity/tilt correction lens group and driving the camera-shake correction lens group as one cycle in the camera-shake correction mode.

12. The lens apparatus of claim 11, wherein the at least one central processing unit which is configured to execute the control unit configured such that a duty ratio of a time when the first eccentricity/tilt correction lens group is driven per one cycle in the second mode is variable.

13. The lens apparatus of claim 12, wherein the at least one central processing unit which is configured to execute the control unit configured to change the duty ratio based on the position information of the movable lens group.

14. The lens apparatus of claim 12, further comprising:
an iris which adjust an amount of light,
wherein the at least one central processing unit which is configured to execute the control unit configured to change the duty ratio based on position information of the iris.

15. The lens apparatus of claim 10, further comprising:
a sensor which detects camera-shake,
wherein the at least one central processing unit which is configured to execute the control unit configured to selectively switch the alignment mode and the camera-shake correction mode based on a camera-shake detection result by the sensor.

16. An image capturing apparatus comprising:
the lens apparatus of claim 1.

* * * * *